United States Patent
Ohnishi et al.

(10) Patent No.: US 10,630,195 B2
(45) Date of Patent: Apr. 21, 2020

(54) CONVERTER AND POWER CONVERSION DEVICE USING SAME

(71) Applicant: TOSHIBA MITSUBISHI-ELECTRIC INDUSTRIAL SYSTEMS CORPORATION, Chuo-ku (JP)

(72) Inventors: Keisuke Ohnishi, Chuo-ku (JP); Shoichi Abe, Chuo-ku (JP); Kazunori Sanada, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/080,838

(22) PCT Filed: Apr. 12, 2016

(86) PCT No.: PCT/JP2016/061757
§ 371 (c)(1),
(2) Date: Aug. 29, 2018

(87) PCT Pub. No.: WO2017/179112
PCT Pub. Date: Oct. 19, 2017

(65) Prior Publication Data
US 2019/0058414 A1    Feb. 21, 2019

(51) Int. Cl.
*H02M 7/12*   (2006.01)
*H02M 7/483*  (2007.01)
(Continued)

(52) U.S. Cl.
CPC .............. *H02M 7/12* (2013.01); *H02M 1/32* (2013.01); *H02M 7/483* (2013.01); *H02M 2001/0006* (2013.01); *H02M 2001/0054* (2013.01)

(58) Field of Classification Search
None
See application file for complete search history.

(56) References Cited

U.S. PATENT DOCUMENTS

| 9,007,045 B2* | 4/2015 | Terada ................... G05F 1/575 |
| | | 323/275 |
| 9,041,367 B2* | 5/2015 | Dao ....................... G05F 1/573 |
| | | 323/273 |

(Continued)

FOREIGN PATENT DOCUMENTS

| EP | 2 164 161 A2 | 3/2010 |
| JP | 2008-22625 A | 1/2008 |

(Continued)

OTHER PUBLICATIONS

International Search Report dated Jun. 21, 2016, in PCT/JP2016/061757 filed Apr. 12, 2016.

(Continued)

*Primary Examiner* — Jue Zhang
*Assistant Examiner* — Henry E Lee, III
(74) *Attorney, Agent, or Firm* — Oblon, McClelland, Maier & Neustadt, L.L.P.

(57) ABSTRACT

A converter includes a first diode having an anode and a cathode connected respectively to an input terminal and a first output terminal, a second diode having an anode and a cathode connected respectively to a second output terminal and the input terminal, a first transistor connected between the first output terminal and the input terminal, a second transistor connected between the input terminal and the second output terminal, and a bidirectional switch connected between the input terminal and a third output terminal and including third to sixth diodes and a third transistor. Each of the first diode, the second diode, and the third transistor is made of a wide bandgap semiconductor. Each of the first and (Continued)

second transistors and the third to sixth diodes is made of a semiconductor other than the wide bandgap semiconductor.

12 Claims, 10 Drawing Sheets

(51) Int. Cl.
*H02M 1/32* (2007.01)
*H02M 1/00* (2006.01)

(56) References Cited

U.S. PATENT DOCUMENTS

| | | | | |
|---|---|---|---|---|
| 9,170,591 | B2* | 10/2015 | Pons | G05F 1/575 |
| 9,772,639 | B2* | 9/2017 | Farber | H03K 5/2481 |
| 2007/0206338 | A1* | 9/2007 | Ishino | G05F 1/575 |
| | | | | 361/93.9 |
| 2016/0204713 | A1* | 7/2016 | Dwari | H02M 7/217 |
| | | | | 363/89 |
| 2017/0244334 | A1 | 8/2017 | Ohnishi et al. | |

FOREIGN PATENT DOCUMENTS

| | | |
|---|---|---|
| JP | 2010-68642 A | 3/2010 |
| JP | 2011-078296 A | 4/2011 |
| WO | WO 2016/031042 A1 | 3/2016 |

OTHER PUBLICATIONS

Kolar. J.W. et al., "A Novel Three-Phase Utility Interface Minimizing Line Current Harmonics of High-Power Telecommunications Rectifier Modules", 0-7803-2034-4-4/94 IEEE, 1994, pp. 367-374.
Office Action dated May 14, 2019 in Japanese Patent Application No. 2018-511789 (with unedited computer generated English translation).
Office Action dated Aug. 22, 2019 in Canada Patent Application No. 3,019,875 (4 pages).

* cited by examiner

FIG.3
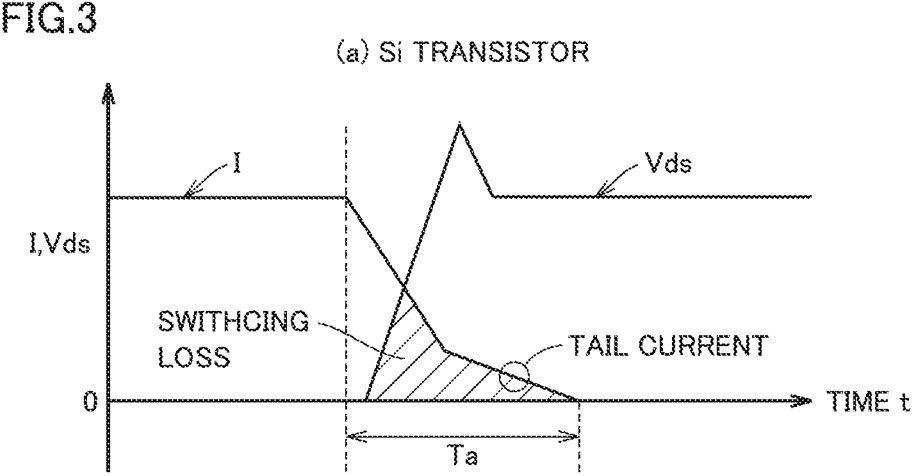
(a) Si TRANSISTOR
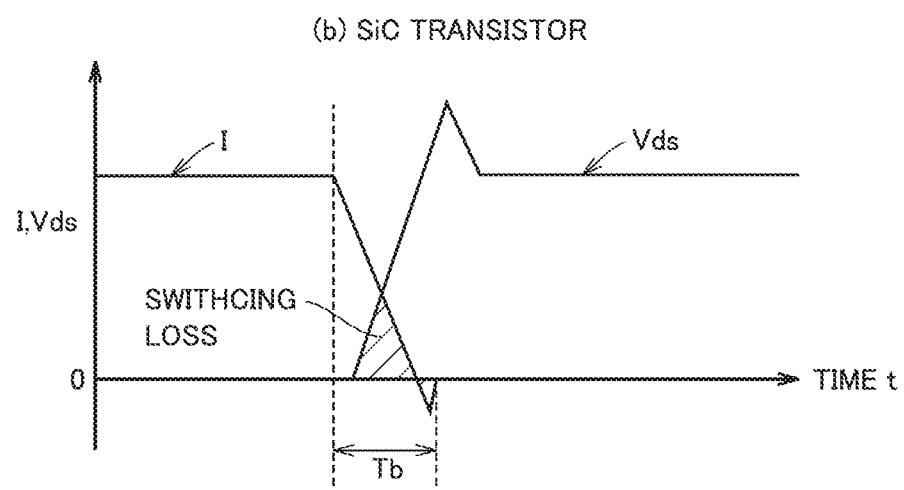
(b) SiC TRANSISTOR
FIG.4
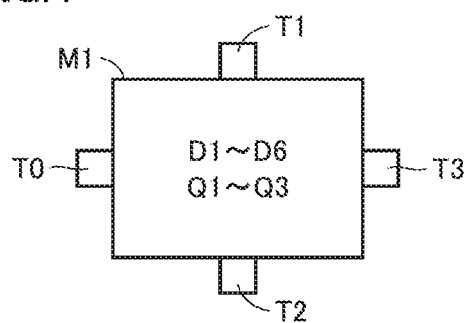

US 10,630,195 B2

CONVERTER AND POWER CONVERSION DEVICE USING SAME

TECHNICAL FIELD

The present invention relates to a converter and a power conversion apparatus including the same, and particularly, to a converter that converts an AC voltage into first to third DC voltages and a power conversion apparatus including the converter.

BACKGROUND ART

Japanese Patent Laying-Open No. 2011-78296 (PTD 1) discloses a converter that includes four transistors and six diodes and converts an AC voltage into a high voltage, a low voltage, and an intermediate voltage. Two diodes that perform a reverse recovery operation among the six diodes are made of wide bandgap semiconductors, leading to a reduced recovery loss of the converter. Besides, the other four diodes that do not perform the reverse recovery operation are made of semiconductors other than wide bandgap semiconductors, leading to a reduced cost of the converter.

CITATION LIST

Patent Document

PTD 1: Japanese Patent Laying-Open No. 2011-78296

SUMMARY OF INVENTION

Technical Problem

A conventional converter includes a large number of semiconductor elements, which increases a device size, leading to high cost. The conventional converter also has a large loss resulting from the four transistors.

A main object of the present invention is therefore to provide a compact, inexpensive, and low-loss converter, and a power conversion apparatus including the same.

Solution to Problem

A converter according to the present invention is a converter that converts an AC voltage supplied to an input terminal into first to third DC voltages and outputs the first to third DC voltages respectively to first to third output terminals. The converter includes a first diode having an anode and a cathode connected respectively to the input terminal and a first output terminal, a second diode having an anode and a cathode connected respectively to a second output terminal and the input terminal, a first transistor connected between the first output terminal and the input terminal, a second transistor connected between the input terminal and the second output terminal, and a first bidirectional switch connected between the input terminal and the third output terminal. The first DC voltage is higher than the second DC voltage, and the third DC voltage is an intermediate voltage between the first and second DC voltages. The first bidirectional switch includes third to sixth diodes and a third transistor. The third and fourth diodes have anodes connected respectively to the input terminal and the third output terminal and cathodes connected together to a first electrode of the third transistor. The fifth and sixth diodes have cathodes connected respectively to the input terminal and the third output terminal and anodes connected together to a second electrode of the third transistor. Each of the first diode, the second diode, and the third transistor is made of a wide bandgap semiconductor. Each of the first transistor, the second transistor, and the third to sixth diodes is made of a semiconductor other than the wide bandgap semiconductor.

Advantageous Effects of Invention

The converter according to the present invention includes three transistors and six diodes. This converter accordingly has fewer semiconductor elements than a conventional converter, thus reducing the size and cost of the device. Further, the first and second diodes that perform the reverse recovery operation and the third transistor that switches a large current are made of wide bandgap semiconductors, thus reducing a switching loss and a recovery loss. The third to sixth diodes that do not perform the reverse recovery operation and the first and second transistors that switch a small current are made of semiconductors other than wide bandgap semiconductors, leading to a reduced cost.

BRIEF DESCRIPTION OF DRAWINGS

FIG. 3 is a time chart for explaining a switching loss of the transistor shown in FIG. 1.

FIG. 4 is a block diagram showing a configuration of a semiconductor module of the converter shown in FIG. 1.

DESCRIPTION OF EMBODIMENTS

Embodiment 1

Figure 1:
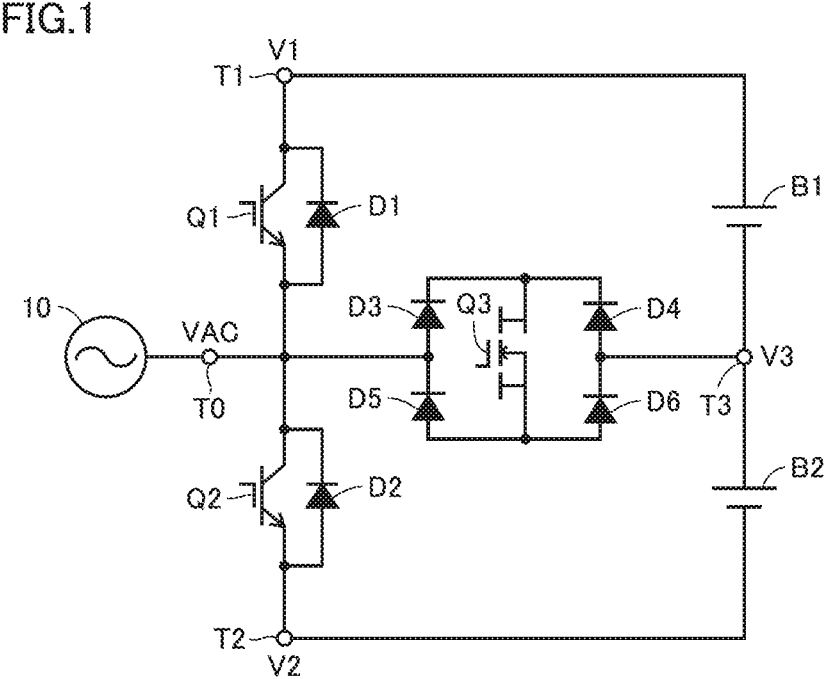
FIG. 1 is a circuit diagram showing a configuration of a converter according to Embodiment 1 of the present invention.

FIG. 1 is a circuit diagram showing a configuration of a converter according to Embodiment 1 of the present invention. With reference to FIG. 1, this converter includes an input terminal T0, output terminals T1 to T3 (first to third output terminals), diodes D1 to D6 (first to sixth diodes), and transistors Q1 to Q3 (first to third transistors).

Input terminal T0 receives an AC voltage VAC of a commercial frequency from, for example, a commercial AC power supply 10. Output terminals T1 and T3 are connected respectively with the positive electrode and negative electrode of a battery B1. Output terminals T3 and T2 are connected respectively with the positive electrode and negative electrode of a battery B2. Each of batteries B1 and B2 stores DC power. Batteries B1 and B2 are charged with DC voltages having the same value.

When the voltages at output terminals T1, T2, and T3 are respectively DC voltages V1, V2, and V3, V1>V3>V2, and V3=(V1+V2)/2. This converter converts AC voltage VAC applied to input terminal T0 into DC voltages V1 to V3 and outputs DC voltages V1 to V3 respectively to output terminals T1 to T3. If output terminal T3 is grounded, DC voltages V1 to V3 are respectively a positive voltage, a negative voltage, and 0 V.

Diode D1 has an anode connected to input terminal T0 and a cathode connected to output terminal T1. Diode D2 has an anode connected to output terminal T2 and a cathode connected to input terminal T0. Transistor Q1 has a collector connected to output terminal T1 and an emitter connected to input terminal T0. Transistor Q2 has a collector connected to input terminal T0 and an emitter connected to output terminal T2.

Diodes D3 and D4 have anodes connected respectively to input terminal T0 and output terminal T3 and cathodes connected to each other. Diodes D5 and D6 have cathodes connected respectively 5 to input terminal T0 and output terminal T3 and anodes connected to each other.

Transistor Q3 has a drain (first electrode) connected to the cathodes of diodes D3 and D4 and a source (second electrode) connected to the anodes of diodes D5 and D6. Diodes D3 to D6 and transistor Q3 constitute a first bidirectional switch connected between input terminal T0 and output terminal T3.

Diode D1 allows a current to flow from input terminal T0 to output terminal T1 during a period in which AC voltage VAC is a positive voltage, thereby charging battery B1. Diode D2 allows a current to flow from output terminal T2 to input terminal T0 during a period in which AC voltage VAC is a negative voltage, thereby charging battery B2.

Since diodes D1 and D2 allow flows of the currents that charge batteries B1 and B2, diodes D1 and D2 have rated currents set to relatively large values. The rated current of each of diodes D1 and D2 is, for example, 600 A, which is greater than the rated current of each of diodes D3 to D6 and transistors Q1 to Q3. For reduced loss in diodes D1 and D2, each of diodes D1 and D2 is made of silicon carbide (SiC) that is a wide bandgap semiconductor, which is, for example, a Schottky barrier diode.

In some cases, the power is regenerated from a load (not shown) such as a motor connected with batteries B1 and B2, voltage V1 at output terminal T1 exceeds a rated voltage V1R, and voltage V2 at output terminal T2 falls below a rated voltage V2R. Rated voltage V1R is a voltage obtained by subtracting a threshold voltage of diode D1 from a positive peak voltage of AC voltage VAC. Rated voltage V2R is a voltage obtained by adding a threshold voltage of diode D2 to a negative peak voltage of AC voltage VAC.

When voltage V1 at output terminal T1 exceeds rated voltage V1R, transistor Q1 allows a current to flow from output terminal T1 to input terminal T0, thus reducing voltage V1 at output terminal T1. When voltage V2 at output terminal T2 falls below rated voltage V2R, transistor Q2 allows a current to flow from input terminal T0 to output terminal T2, thus increasing voltage V2 at output terminal T2.

Since this converter is used as a power conversion apparatus (e.g., uninterruptible power system) with small regenerated power, the rated currents of transistors Q1 and Q2 are set to relatively small values. The rated current of each of transistors Q1 and Q2 is, for example, 300 A, which is smaller than the rated current of each of diodes D1 to D6 and transistor Q3. Transistors Q1 and Q2 have a low loss, eliminating the need for forming transistors Q1 and Q2 using expensive wide bandgap semiconductors. Thus, for reduced device cost, each of transistors Q1 and Q2 is made of silicon (Si) that is a semiconductor other than the wide bandgap semiconductor, which is, for example, an insulated gate bipolar transistor (IGBT).

Diodes D3 to D6 and transistor Q3 constitute a first bidirectional switch for setting voltage V3 at output terminal T3 to an intermediate voltage between voltages V1 and V2. The rated current of each of diodes D3 to D6 and transistor Q3 is set to a value smaller than the rated current of each of diodes D1 and D2 and greater than the rated current of each of transistors Q1 and Q2. The rated current of each of diodes D3 to D6 is, for example, 450 A. The rated current of transistor Q3 is, for example, 500 A.

Diodes D3 to D6 have a low loss, thus eliminating the need for forming diodes D3 to D6 using expensive wide bandgap semiconductors. For reduced device cost, thus, each of diodes D3 to D6 is made of silicon (Si) that is a semiconductor other than the wide bandgap semiconductor. For a reduced loss of transistor Q3, transistor Q3 is made of silicon carbide (SiC) that is a wide bandgap semiconductor, which is, for example, an N-channel MOS transistor.

Figure 2:
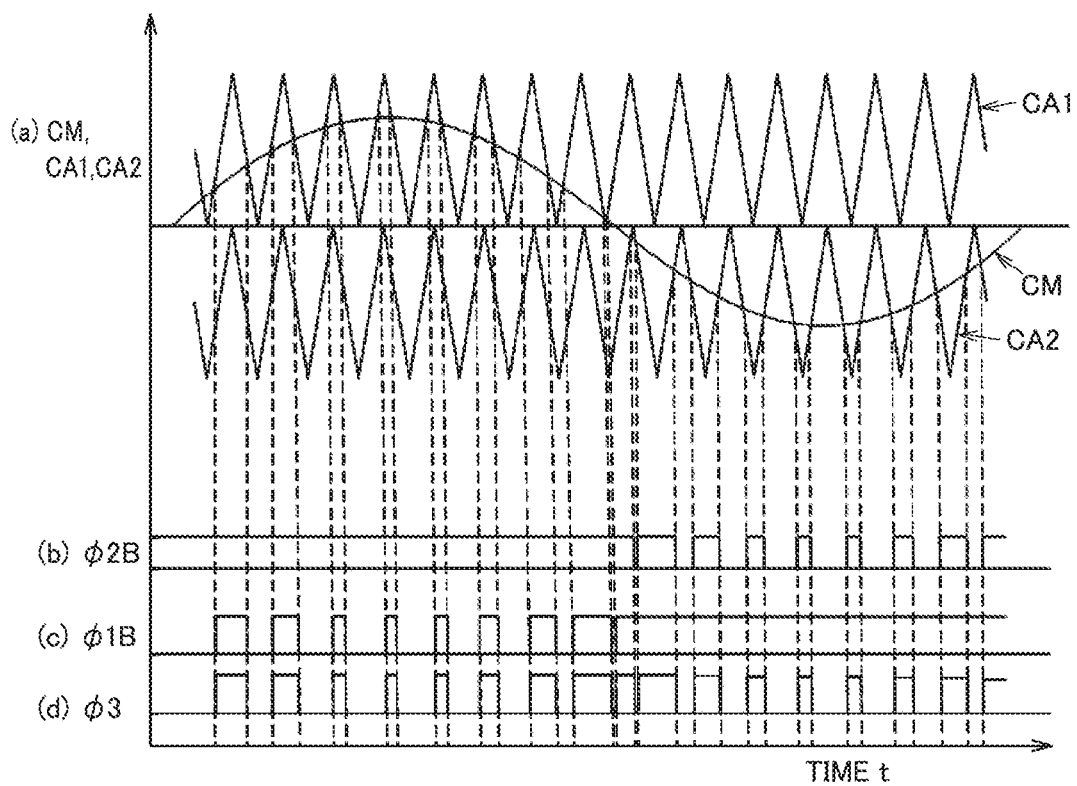
FIG. 2 is a time chart showing waveforms of PWM signals that control a transistor shown in FIG. 1.

An operation of this converter will now be described. The gates of transistors Q1 to Q3 are supplied respectively with pulse width modulation (PWM) signals $\varphi 1$ to $\varphi 3$ from a controller (not shown). FIGS. 2 (a) to (d) show how PWM signals $\varphi 1$ to $\varphi 3$ are generated and also the waveforms of these signals. In particular, FIG. 2(a) shows the waveforms of a sine-wave command value signal CM, a positive-side triangular wave carrier signal CA1, and a negative-side triangular wave carrier signal CA2, and FIGS. 2(b) to (d) respectively show the waveforms of PWM signals $\varphi 2B$, $\varphi 1B$, and $\varphi 3$. PWM signals $\varphi 2B$ and $\varphi 1B$ are respectively inversion signals of PWM signals $\varphi 2$ and $\varphi 1$.

With reference to FIGS. 2(a) to (d), the frequency of sine-wave command value signal CM is, for example, a commercial frequency. The phase of sine-wave command value signal CM is the same as, for example, the phase of AC voltage VAC of the commercial frequency. Carrier signals CA1 and CA2 have the same cycle and phase. The cycles of carrier signals CA1 and CA2 are sufficiently smaller than the cycle of sine-wave command value signal CM.

The level of sine-wave command value signal CM is compared with the level of positive-side triangular wave carrier signal CA1. When the level of sine-wave command value signal CM is higher than the level of positive-side triangular wave carrier signal CA1, PWM signal $\varphi 1B$ is set to "L" level, and PWM signal $\varphi 1$ is set to "H" level. When the level of sine-wave command value signal CM is lower than the level of positive-side triangular wave carrier signal CAL PWM signal $\varphi 1B$ is set to "H" level, and PWM signal $\varphi 1$ is set to "L" level.

Thus, PWM signal $\varphi 1$ is set to "H" level and "L" level in synchronization with carrier signal CA1 during a period in which the level of sine-wave command value signal CM is positive, and PWM signal φ1 is fixed to "L" level during a period in which the level of sine-wave command value signal CM is negative.

The ratio between the time in which the PWM signal is set to "H" level in one cycle and the time of one cycle of the PWM signal is referred to as a duty ratio. During a period in which the level of sine-wave command value signal CM is positive, the duty ratio of PWM signal φ1 is largest in the vicinity of a positive peak (90 degrees) of sine-wave command value signal CM, decreases as farther from the peak, and is smallest in the vicinity of 0 degrees and in the vicinity of 180 degrees. During a period in which the level of sine-wave command value signal CM is negative, the duty ratio of PWM signal φ1 is fixed to 0.

The level of sine-wave command value signal CM is compared with the level of negative-side triangular wave carrier signal CA2. When the level of sine-wave command value signal CM is higher than the level of negative-side triangular wave carrier signal CA2, PWM signal φ2B is set to "H" level, and PWM signal φ2 is set to "L" level. When the level of sine-wave command value signal CM is lower than the level of negative-side triangular wave carrier signal CA2, PWM signal φ2B is set to "L" level, and PWM signal φ2 is set to "H" level.

During a period in which the level of sine-wave command value signal CM is positive, thus, PWM signal φ2 is fixed to "L" level. During a period in which the level of sine-wave command value signal CM is negative, PWM signal φ2 is set to "H" level and "L" level in synchronization with carrier signal CA2. During a period in which the level of sine-wave command value signal CM is negative, the duty ratio of PWM signal φ2 is largest in the vicinity of a positive peak (270 degrees) of sine-wave command value signal CM, decreases as farther from the peak, and is smallest in the vicinity of 180 degrees and in the vicinity of 360 degrees. During a period in which the level of sine-wave command value signal CM is positive, the duty ratio of PWM signal φ2 is fixed to 0.

PWM signal φ3 is an AND signal of PWM signals φ2B and φ1B. PWM signal φ3 is set to "H" level and "L" level in synchronization with carrier signals CA1 and CA2. During a period in which the level of sine-wave command value signal CM is positive, the duty ratio of PWM signal φ3 is smallest in the vicinity of a positive peak (90 degrees) of sine-wave command value signal CM, increases as farther from the peak, and is largest in the vicinity of 0 degrees and in the vicinity of 180 degrees. During a period in which the level of sine-wave command value signal CM is negative, the duty ratio of PWM signal φ3 is smallest in the vicinity of a negative peak (270 degrees) of sine-wave command value signal CM, increases as farther from the peak, and is largest in the vicinity of 180 degrees and in the vicinity of 360 degrees.

A current flowing through each of diodes D1 to D6 and transistors Q1 to Q3 during the operation of the converter will now be described. It is assumed that the power factor is 1.0 and that sine-wave command value signal CM and AC voltage VAC match in phase. During a period in which the level of sine-wave command value signal CM is positive, PWM signals φ1 and φ3 are alternately set to "H" level, and PWM signal φ2 is fixed to "L" level.

During this period, when DC voltage V1 is lower than rated voltage V1R, and when PWM signals φ1 and φ3 are set respectively to "H" level and "L" level, transistor Q3 is turned off and a current I1 at a level that corresponds to the level of AC voltage VAC flows from input terminal T0 via diode D1 to output terminal T1. At this time, no current flows through transistor Q1.

During this period, when the power is regenerated from the load (not shown) to battery B1 and DC voltage V1 exceeds rated voltage V1R, and when PWM signals φ1 and φ3 are set respectively to "H" level and "L" level, transistor Q1 is turned on and transistor Q3 is turned off. This allows a current I1 at a level that corresponds to the levels of DC voltage V1 and AC voltage VAC to flow from output terminal T1 via transistor Q1 to input terminal T0, so that DC voltage V1 decreases to rated voltage V1R.

When PWM signals φ1 and φ3 are set respectively to "L" level and "H" level, transistor Q1 is turned off and transistor Q3 is turned on, allowing a current I1A at a level that complements current I1 to flow through a path from input terminal T0 via diode D3, transistor Q3, and diode D6 to output terminal T3.

During this period, the effective value of the current flowing through diode D1 is largest among diodes D1 to D6 and transistors Q1 to Q3, and a switching loss occurs in transistor Q3. A reverse bias voltage is applied to diode D1 every time transistor Q3 changes from on state to off state, so that diode D1 performs a reverse recovery operation. During this period, no current flows through diodes D2, D4, and D5. Since DC voltage V1 exceeds rated voltage V1R for a short period of time, a low loss occurs in transistor Q1.

During a period in which the level of sine-wave command value signal CM is negative, PWM signals φ2 and φ3 are alternately set to "H" level, and PWM signal φ1 is fixed to "L" level. During this period, when DC voltage V2 is higher than rated voltage V2R, and when PWM signals φ2 and φ3 are set respectively to "H" level and "L" level, transistor Q3 is turned off, allowing a current I2 at a level that corresponds to the levels of DC voltage V2 and AC voltage VAC to flow from output terminal T2 via diode D2 to input terminal T0. At this time, no current flows through transistor Q2. Rated voltage V2R is a voltage that is a difference between the negative-side peak value of AC voltage VAC and the threshold voltage of diode D2.

During this period, when, for example, the power is regenerated from the load (not shown) to battery B2 and DC voltage V2 falls below rated voltage V2R, and when PWM signals φ2 and φ3 are set respectively to "H" level and "L" level, transistor Q2 is turned on and transistor Q3 is turned off. This allows a current I2 at the level that corresponds to the levels of DC voltage V2 and AC voltage VAC to flow from input terminal T0 via transistor Q2 to output terminal T2, so that DC voltage V2 increases to rated voltage V2R.

When PWM signals φ2 and φ3 are set respectively to "L" level and "H" level, transistor Q2 is turned off and transistor Q3 is turned on, allowing a current I2A at a level that complements a current I2 to flow through a path from output terminal T3 via diode D4, transistor Q3, and diode D5 to input terminal T0.

During this period, the effective value of the current flowing through diode D2 is largest among diodes D1 to D6 and transistors Q1 to Q3, and a switching loss occurs in transistor Q3. A reverse bias voltage is applied to diode D2 every time transistor Q3 changes from off state to on state, so that diode D2 performs the reverse recovery operation. During this period, no current flows through diodes D1, D3, and D6. Since DC voltage V2 falls below rated voltage V2R in a short period of time, the loss generated in transistor Q2 is low.

In summary, a large current flows through diodes D1 and D2, so that diodes D1 and D2 perform the reverse recovery operation. A current smaller than the current through diodes D1 and D2 flows through diodes D3 to D6, so that diodes D3 to D6 do not perform the reverse recovery operation. A current flows through transistor Q3, and a switching loss occurs in transistor Q3. A current flows through transistors Q1 and Q2 in a short period of time, and losses that occur in transistors Q1 and Q2 are low.

Thus, Schottky barrier diodes that are made of SiC being a wide bandgap semiconductor and have a rated current of a large value (e.g., 600 A) are used as diodes D1 and D2 as described, thereby reducing a recovery loss during the reverse recovery operation. Diodes that are made of Si being a semiconductor other than the wide bandgap semiconductor and have a rated current of a small value (e.g., 450 A) are used as diodes D3 to D6, thereby reducing cost.

Further, an N-channel MOS transistor that is made of SiC being a wide bandgap semiconductor and has a rated current of a large value (e.g., 500 A) is used as transistor Q3, thus reducing a switching loss. IGBTs that are made of Si being a semiconductor other than a wide bandgap semiconductor and have a rated current of a small value (e.g., 450 A) are used as transistors Q1 and Q2, thereby reducing cost.

FIG. 3(a) is a time chart showing a switching operation of an N-channel MOS transistor (referred to as a Si transistor) made of Si, and FIG. 3(b) is a time chart showing a switching operation of an N-channel MOS transistor (referred to as a SiC transistor) made of SiC.

With reference to FIGS. 3(a) and (b), it is assumed that in the initial state, a gate signal (not shown) is set to "H" level to turn on the transistor, a constant current I flows through the transistor, and a drain-source voltage Vds is 0 V. When the gate signal is lowered from "H" level to "L" level to turn off the transistor at a certain time, current I decreases and voltage Vds increases.

As can be seen from FIGS. 3(a) and (b), a time Ta taken for current I to start dropping to reach 0 A in the Si transistor is longer than a time Tb taken for current I to start dropping to reach 0 A in the SiC transistor. In the Si transistor, current I decreases rapidly down to a certain value but changes from the certain value to 0 A for a longer period of time. The current flowing while changing from a certain value to 0 A is referred to as a tail current.

In the SiC transistor, contrastingly, current I decreases rapidly, and a slight overshoot occurs. The switching loss of a transistor, which is the product of current I and voltage Vds, corresponds to the area of a hatched portion in the drawing. The switching loss of the SiC transistor is thus lower than the switching loss of the Si transistor.

FIG. 4 shows the appearance of the converter shown in FIG. 1. With reference to FIG. 4, the converter includes one semiconductor module M1. Semiconductor module M1 is internally provided with diodes D1 to D4 and transistors Q1 to Q3. Semiconductor module M1 is externally provided with input terminal T0 and output terminals T1 to T3. Although semiconductor module M1 is externally provided with signal terminals for supplying PWM signals φ1 to φ3 to the gates of transistors Q1 to Q3, the signal terminals are not shown for simplicity of the drawing.

Figure 5:
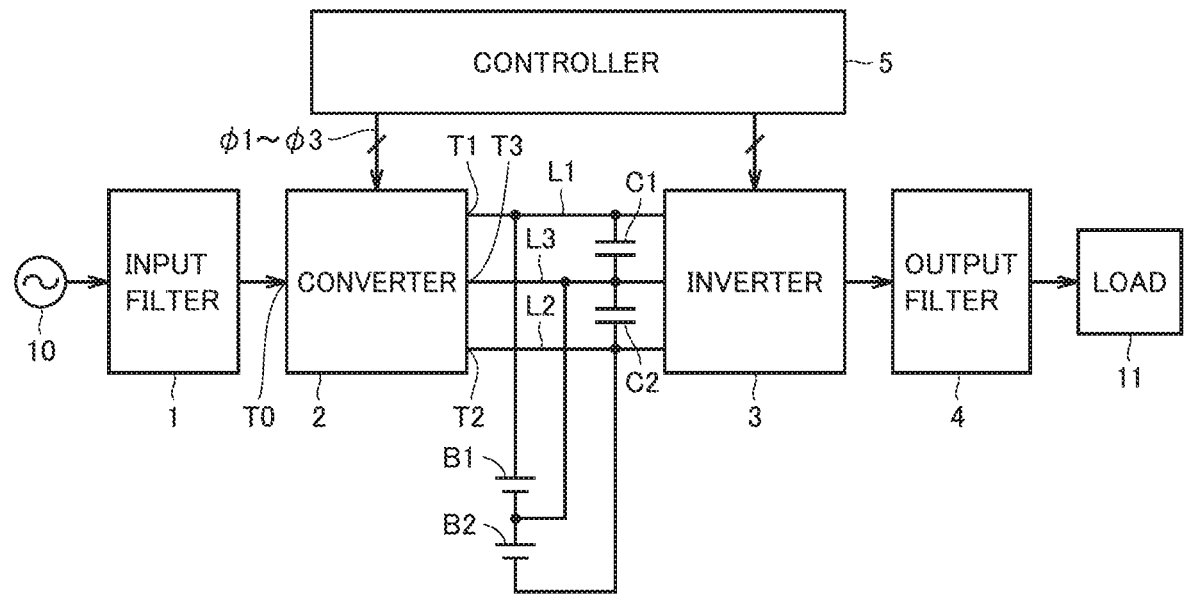
FIG. 5 is a circuit block diagram showing a configuration of an uninterruptible power system including the converter shown in FIG. 1.

FIG. 5 is a circuit block diagram showing a configuration of an uninterruptible power system including the converter shown in FIG. 1. With reference to FIG. 5, the uninterruptible power system includes an input filter 1, a converter 2, a DC positive bus L1, a DC negative bus L2, a DC neutral point bus L3, capacitors C1 and C2, an inverter 3, an output filter 4, and a controller 5.

Input filter 1, which is a low pass filter, allows the AC power of a commercial frequency from commercial AC power supply 10 to pass through input terminal T0 of converter 2 and also prevents a signal of a carrier frequency generated in converter 2 from passing toward commercial AC power supply 10.

DC positive bus L1, DC negative bus L2, and DC neutral point bus L3 have first terminals connected respectively to output terminals T1, T2, and T3 of converter 2, and second terminals connected to three respective input terminals of inverter 3. Capacitor C1 is connected between buses L1 and L3, and capacitor C2 is connected between buses L3 and L2. Buses L1 and L3 are connected respectively to the positive electrode and negative electrode of battery B1, and buses L3 and L2 are connected respectively to the positive electrode and negative electrode of battery B2.

As shown in FIG. 1, converter 2 includes input terminal T0, output terminals T1 to T3, diodes D1 to D6, and transistors Q1 to Q3 and is controlled by PWM signals φ1 to φ3 from controller 5.

During a normal operation in which AC power is supplied normally from commercial AC power supply 10, converter 2 converts AC power supplied from commercial AC power supply 10 via input filter 1 into DC power and supplies the DC power to each of batteries B1 and B2 and also to inverter 3. Each of batteries B1 and B2 stores the DC power.

In other words, converter 2 is controlled by PWM signals φ1 to φ3 supplied from controller 5, generates DC voltages V1 to V3 based on AC voltage VAC supplied from commercial AC power supply 10 via input filter 1, and supplies DC voltages V1 to V3 generated respectively to DC positive bus L1, DC negative bus L2, and DC neutral point bus L3. If output terminal T3 is grounded, DC voltages V1 to V3 are respectively a positive voltage, a negative voltage, and 0 V. DC voltages V1 to V3 are smoothed by capacitors C1 and C2. DC voltages V1 to V3 are supplied to batteries B1 and B2 and inverter 3. During a power failure in which a supply of AC power from commercial AC power supply 10 is stopped, transistor Q1 is fixed to off state, so that the operation of converter 2 is stopped.

Inverter 3 converts DC power generated in converter 2 into AC power during a normal operation in which commercial AC power supply 10 supplies AC power normally and converts DC power of batteries B1 and B2 into AC power during a power failure in which a supply of AC power from commercial AC power supply 10 is stopped.

In other words, inverter 3 generates an AC voltage at three levels based on DC voltages V1 to V3 supplied from converter 2 via buses L1 to L3 during a normal operation and generates AC voltage at three levels based on DC voltages V1 to V3 supplied from batteries B1 and B2 via buses L1 to L3 during a power failure.

Output filter 4 is connected between the output terminal of inverter 3 and load 11. Output filter 4, which is a low pass filter, allows the AC power having a commercial frequency of the AC power output from inverter 3 to pass through load 11 and prevents a signal having a carrier frequency which is generated in inverter 3 from passing toward load 11. In other words, output filter 4 converts the output voltage of inverter 3 into a sine wave of a commercial frequency and supplies the sine wave to load 11.

Controller 5 controls converter 2 and inverter 3 by supplying a PWM signal while monitoring, for example, the AC voltage from commercial AC power supply 10, the AC voltage output to load 11, and DC voltages V1 to V3.

The operation of this uninterruptible power system will now be described. During a normal operation in which commercial AC power supply 10 supplies AC power normally, the AC power from commercial AC power supply 10 is supplied to converter 2 via input filter 1 and is converted into DC power by converter 2. The DC power generated in converter 2 is stored in batteries B1 and B2 and is also supplied to inverter 3, and is then converted into AC power of a commercial frequency by inverter 3. The AC power generated in inverter 3 is supplied to load 11 via output filter 4, thereby operating load 11.

At the occurrence of regenerated power in load 11, the regenerated power is returned to commercial AC power supply 10 via output filter 4, inverter 3, buses L1 to L3, converter 2, and input filter 1.

During a power failure in which a supply of AC power from commercial AC power supply 10 is stopped, the operation of converter 2 is stopped, and the DC power of batteries B1 and B2 is supplied to inverter 3 and is then converted into AC power of a commercial frequency by inverter 3. The AC power generated in inverter 3 is supplied to load 11 via output filter 4, so that the operation of load 11 is continued.

Even when a power failure occurs, thus, the operation of load 11 is continued as long as batteries B1 and B2 store DC power. Upon restart of a supply of the AC power from commercial AC power supply 10, converter 2 restarts the operation, and the DC power generated in converter 2 is supplied to batteries B1 and B2 and inverter 3, returning to the original state.

As described above, since a converter is composed of three transistors Q1 to Q3 and six diodes D1 to D6, fewer semiconductor elements can be used than in a conventional case, thereby reducing the size and cost of the device. Besides, since diodes D1 and D2 that perform the reverse recovery operation and transistor Q3 that switches a current are made of wide bandgap semiconductors, a recovery loss and a switching loss can be reduced. Further, since diodes D3 to D6 that do not perform the reverse recovery operation and transistors Q1 and Q2 that allow a current to flow during only the regeneration operation are made of semiconductors other than wide bandgap semiconductors, thereby reducing cost.

Although SiC is used as the wide bandgap semiconductor in Embodiment 1, the present invention is not limited to this. Other semiconductors can be used as long as they are wide bandgap semiconductors. For example, gallium nitride (GaN) can be used as the wide bandgap semiconductor.

Embodiment 2

Figure 6:
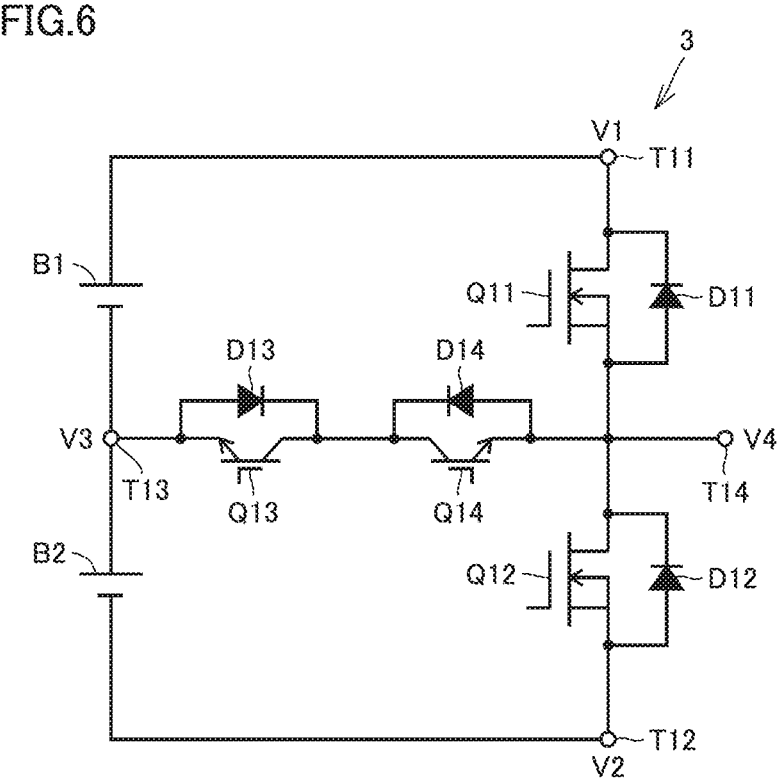
FIG. 6 is a circuit diagram showing a configuration of an inverter of an uninterruptible power system according to Embodiment 2 of the present invention.

FIG. 6 is a circuit block diagram showing a configuration of inverter 3 of an uninterruptible power system according to Embodiment 2 of the present invention. The general arrangement of the uninterruptible power system is as shown in FIG. 5. Converter 2 of the uninterruptible power system is the converter shown in FIG. 1. With reference to FIG. 6, inverter 3 includes input terminals T11 to T13 (first to third output terminals), an output terminal T14 (fourth output terminal), transistors Q11 to Q14 (fourth to seventh transistors), and diodes D11 to D14 (seventh to tenth diodes).

Input terminals T11 to T13 are connected respectively to DC positive bus L1, DC negative bus L2, and DC neutral point bus L3 of FIG. 5. Input terminals T11 and T13 are connected respectively with the positive electrode and negative electrode of battery B1. Input terminals T13 and T12 are connected respectively with the positive electrode and negative electrode of battery B2. Each of batteries B1 and B2 outputs DC voltage. The output voltage of battery B1 is equal to the output voltage of battery B2. Thus, DC voltages V1, V2, and V3 are applied respectively to input terminals T11, T12, and T13, and V1>V3>V2 and V3=(V1+V2)/2. This inverter converts DC voltages V1 to V3 applied to input terminals T11 to T13 into an AC voltage V4 at three levels and then outputs AC voltage V4 to output terminal T14. If input terminal T13 is grounded, DC voltages V1 to V3 are respectively a positive voltage, a negative voltage, and 0 V.

Each of transistors Q11 and Q12 is made of silicon carbide (SiC) that is a wide bandgap semiconductor, which is an N-channel MOS transistor, for example. The rated current of each of transistors Q11 and Q12 is, for example, 600 A and is greater than the rated current of each of transistors Q13 and Q14 and diodes D11 to D14. Each of transistors Q13 and Q14 is made of silicon (Si) that is a semiconductor other than a wide bandgap semiconductor, which is an IGBT, for example. The rated current of each of transistors Q13 and Q14 is 450 A, for example.

Each of diodes D11 and D12 is made of silicon (Si) made of a semiconductor other than a wide bandgap semiconductor. The rated current of each of diodes D11 and D12 is 300 A, for example.

Each of diodes D13 and D14 is a Schottky barrier diode made of silicon carbide (SiC) that is a wide bandgap semiconductor. The rated current of each of diodes D13 and D14 is 500 A, for example. The rated current of each of transistors Q11 and Q12 is greater than the rated current of each of transistors Q13 and Q14 and diodes D11 to D14.

The reason why the specifications of transistors Q11 and Q12 differ from the specifications of transistors Q13 and Q14 and the specifications of diodes D11 and D12 differ from the specifications of diodes D13 and D14 will be described below.

Transistor Q11 has a drain (first electrode) connected to input terminal T11 and a source (second electrode) connected to output terminal T14. Diode D11 has an anode connected to output terminal T14 and a cathode connected to input terminal T11.

Transistor Q12 has a drain connected to output terminal T14 and a source connected to input terminal T12. Diode D12 has an anode connected to input terminal T12 and a cathode connected to output terminal T14. That is to say, diodes D11 and D12 are connected respectively in anti-parallel with transistors Q11 and Q12.

Transistors Q13 and Q14 have collectors (first electrodes) connected to each other and emitters (second electrodes) connected respectively to input terminal T13 and output terminal T14. Diodes D13 and D14 have cathodes connected together to the collectors of transistors Q13 and Q14 and anodes connected respectively to input terminal T13 and output terminal T14. That is to say, diodes D13 and D14 are connected respectively in anti-parallel with transistors Q13 and Q14. Transistors Q13 and Q14 and diodes D13 and D14 constitute a second bidirectional switch connected between input terminal T13 and output terminal T14.

Figure 7:
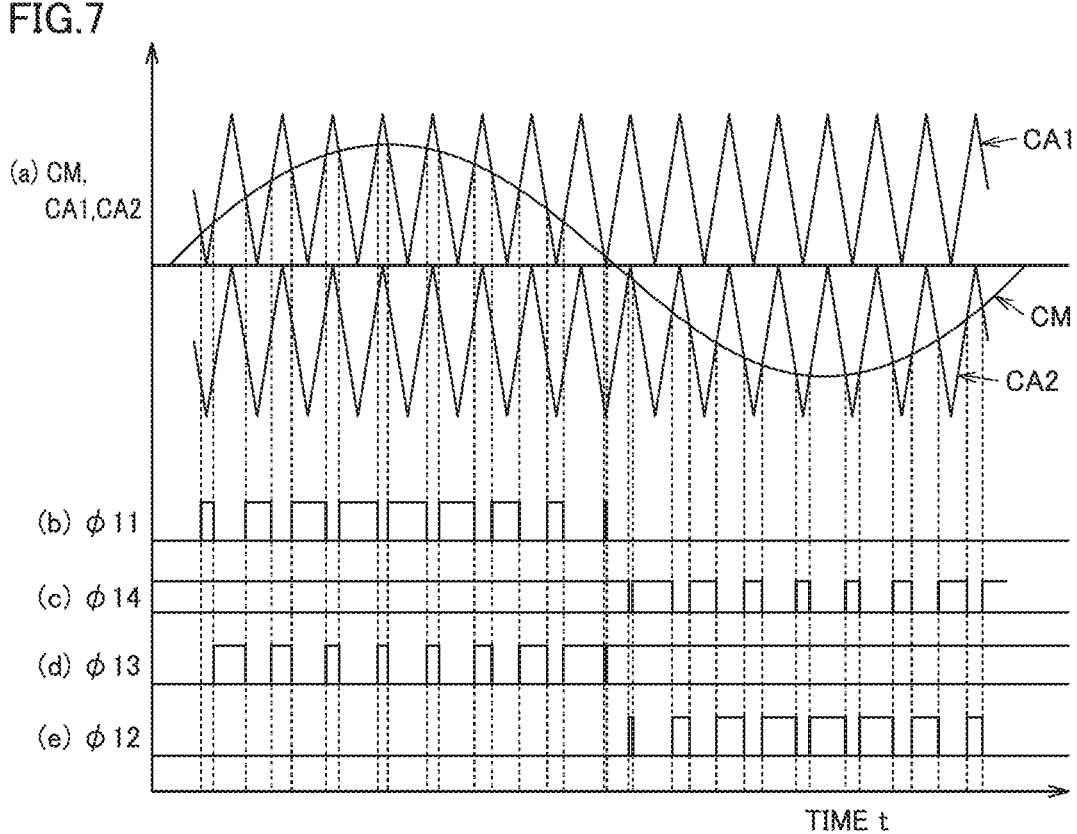
FIG. 7 is a time chart showing waveforms of four PWM signals that control four transistors shown in FIG. 6.

The operation of this inverter will now be described. The gates of transistors Q11 to Q14 are supplied respectively with PWM signals φ11 to φ14 from controller 5. FIGS. 7(a) to (e) show how PWM signals φ11 to φ14 are generated and the waveforms of these signals. In particular, FIG. 7(a) shows the waveforms of sine-wave command value signal CM, positive-side triangular wave carrier signal CA1, and negative-side triangular wave carrier signal CA2, and FIGS. 7(b) to (e) respectively show the waveforms of PWM signals φ11, φ14, φ13, and φ12.

With reference to FIGS. 7(a) to (e), the frequency of sine-wave command value signal CM is, for example, a commercial frequency. Carrier signals CA1 and CA2 have the same cycle and phase. The cycles of carrier signals CA1 and CA2 are sufficiently smaller than the cycle of sine-wave command value signal CM.

The level of sine-wave command value signal CM is compared with the level of positive-side triangular wave carrier signal CA1. When the level of sine-wave command value signal CM is higher than the level of positive-side triangular wave carrier signal CA1, PWM signals φ11 and φ13 are set respectively to "H" level and "L" level. When the level of sine-wave command value signal CM is lower than the level of positive-side triangular wave carrier signal CA1, PWM signals φ11 and φ13 are set respectively to "L" level and "H" level.

During a period in which the level of sine-wave command value signal CM is positive, thus, PWM signals φ11 and φ13 are alternately set to "H" level in synchronization with carrier signal CA1, so that transistors Q11 and Q13 are alternately turned on. During a period in which the level of sine-wave command value signal CM is negative, PWM signals φ11 and φ13 are set respectively to "L" level and "H" level, and the transistor Q11 is fixed to off state and transistor Q13 is fixed to on state.

The level of sine-wave command value signal CM is compared with the level of negative-side triangular wave carrier signal CA2. When the level of sine-wave command value signal CM is higher than the level of negative-side triangular wave carrier signal CA2, PWM signals φ12 and φ14 are set respectively to "L" level and "H" level. When the level of sine-wave command value signal CM is lower than the level of negative-side triangular wave carrier signal CA2, PWM signals φ12 and φ14 are set respectively to "H" level and "L" level.

During a period in which the level of sine-wave command value signal CM is positive, thus, PWM signals φ12 and φ14 are set respectively to "L" level and "H" level, and transistor Q12 is fixed to off state and transistor Q14 is fixed to on state. During a period in which the level of sine-wave command value signal CM is negative, PWM signals φ12 and φ14 are alternately set to "H" level in synchronization with carrier signal CA2, so that transistors Q12 and Q14 are alternately turned on.

The ratio between the time in which the PWM signal is set to "H" level in one cycle and the time of one cycle of the PWM signal is referred to as a duty ratio. During a period in which the level of sine-wave command value signal CM is positive, the duty ratio of PWM signal φ11 is largest in the vicinity of a positive peak (90 degrees) of sine-wave command value signal CM, decreases as farther from the peak, and is zero in the vicinity of 0 degrees and in the vicinity of 180 degrees. The duty ratio of PWM signal φ11 is fixed to zero during a period in which the level of sine-wave command value signal CM is negative. PWM signal φ13 is an inversion signal of PWM signal φ11.

The duty ratio of PWM signal φ12 is fixed to zero during a period in which the level of sine-wave command value signal CM is positive. The duty ratio of PWM signal φ12 is largest in the vicinity of a negative peak (270 degrees) of sine-wave command value signal CM, decreases as farther from the peak, and is zero in the vicinity of 180 degrees and in the vicinity of 360 degrees. The duty ratio of PWM signal φ12 is fixed to zero during a period in which the level of sine-wave command value signal CM is positive. PWM signal φ14 is an inversion signal of PWM signal φ12.

Figure 8:
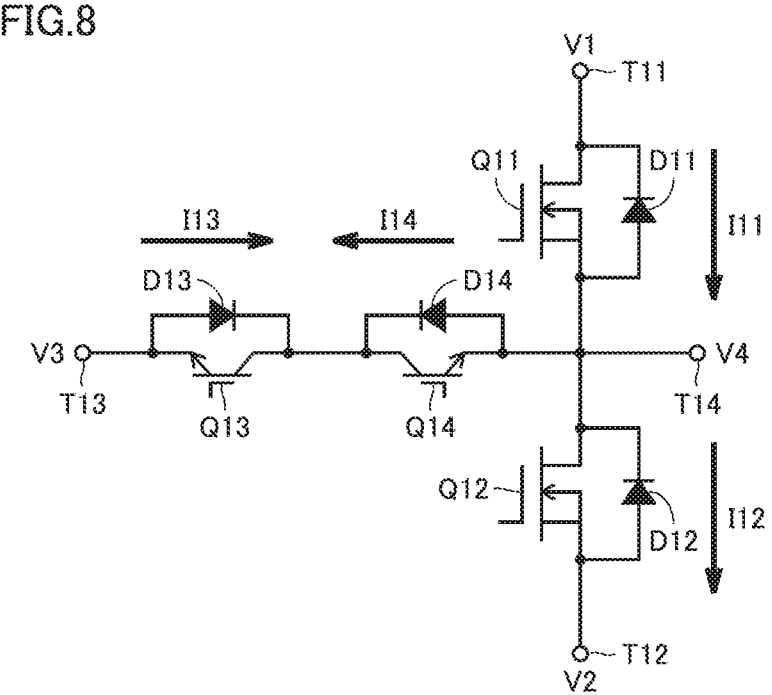
FIG. 8 is a circuit diagram for explaining currents flowing through the inverter shown in FIG. 6.

The current flowing through each of transistors Q11 to Q14 and diodes D11 to D14 during the operation of the inverter will now be described. It is assumed as shown in FIG. 8 that the current flowing from input terminal T11 to output terminal T14 is I11, the current flowing from output terminal T14 to input terminal T12 is I12, the current flowing from input terminal T13 to output terminal T14 is I13, and the current flowing from output terminal T14 to input terminal T13 is I14.

Figure 9:
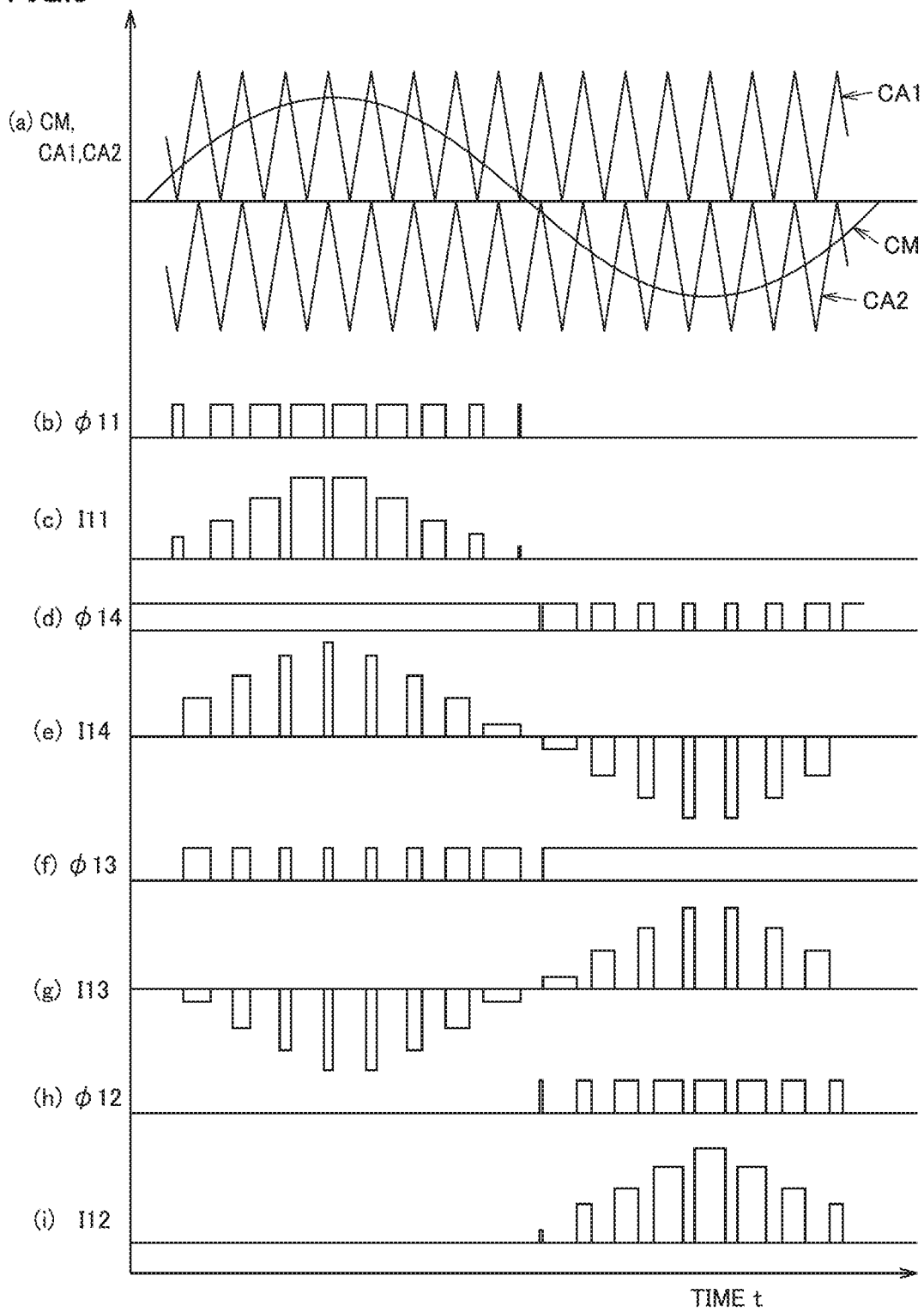
FIG. 9 is a time chart showing currents flowing through the inverter shown in FIG. 6.

FIGS. 9(a) to (i) are time charts showing the operation of the inverter. In particular, FIG. 9(a) shows the waveforms of sine-wave command value signal CM, positive-side triangular wave carrier signal CA1, and negative-side triangular wave carrier signal CA2, FIGS. 9(b), (d), (f), and (h) respectively show the waveforms of PWM signals φ11, φ14, φ13, and φ12, and FIGS. 9(c), (e), (g), and (i) respectively show the waveforms of currents I11, I14, I13, and I12. The positive currents of currents I11 to I14 show the currents flowing through transistor Q, and the negative currents thereof show the currents flowing through diode D. Shown here is the case in which the power factor is 1.0.

With reference to FIGS. 9(a) to (i), during a period in which the level of sine-wave command value signal CM is positive, PWM signals φ14 and φ12 are fixed respectively to "H" level and "L" level, and PWM signals φ11 and φ13 are alternately set to "H" level. Thus, transistors Q14 and Q12 are fixed respectively to on state and off state, so that transistors Q11 and Q13 are alternately turned on and DC voltages V1 and V3 alternately appear at output terminal T14.

During this period, current I11 at the level that corresponds to on time of transistor Q11 flows when transistor Q11 is turned on, and current I13 at the level that complements current I11 flows through a path formed of diode D13 and transistor Q14 when transistor Q11 is turned off.

Since transistor Q12 is fixed to off state, no current flows through transistor Q12, and no switching loss occurs in transistor Q12. Since a current flows through diode D13 and no current flows through transistor Q13 though transistor Q13 is turned on/off, no switching loss occurs in transistor Q13. Since transistor Q14 is fixed to on state, a current flows through transistor Q14, but no switching loss occurs in transistor Q14. During this period, thus, the effective value of the current flowing through transistor Q11 is largest and the switching loss in transistor Q11 is largest among transistors Q11 to Q14.

A reverse bias voltage is applied to diode D13 every time transistor Q11 changes from off state to on state, so that diode D13 performs the reverse recovery operation. During this period, no current flows through diodes D11, D12, and D14.

During a period in which the level of sine-wave command value signal CM is negative, PWM signals φ13 and φ11 are fixed respectively to "H" level and "L" level, and PWM signals φ12 and φ14 are alternately set to "H" level. Thus, transistors Q13 and Q11 are fixed respectively to on state and off state, and transistors Q12 and Q14 are alternately turned on, so that DC voltages V2 and V3 alternately appear at output terminal T14.

During this period, current I12 at the level that corresponds to on time of transistor Q12 flows when transistor Q12 is turned on, and current I13 flows through a path formed of diode D14 and transistor Q13 when transistor Q12 is turned off.

Since transistor Q11 is fixed to off state, no current flows through transistor Q11, and no switching loss occurs in transistor Q11. Since a current flows through diode D14 and no current flows through transistor Q14 though transistor Q14 is turned on/off, no switching loss occurs in transistor Q14. Since transistor Q13 is fixed to on state, a current flows through transistor Q13 but no switching loss occurs in transistor Q13. During this period, thus, the effective value of the current flowing through transistor Q12 is largest and the switching loss in transistor Q12 is largest among transistors Q11 to Q14.

A reverse bias voltage is applied to diode D14 every time transistor Q12 changes from off state to on state, so that diode D14 performs the reverse recovery operation. During this period, no current flow through diodes D11, D12, and D13.

In summary, a large current flows through transistors Q11 and Q12, and a switching loss occurs in transistors Q11 and Q12. A current smaller than the current through transistors Q11 and Q12 flows through transistors Q13 and Q14, and no switching loss occurs in transistors Q13 and Q14.

N-channel MOS transistors that are made of SiC being a wide bandgap semiconductor and have a rated current of a large value (e.g., 600 A) are used as transistors Q11 and Q12 as described above, thereby reducing switching loss. IGBTs that are made of Si being a semiconductor other than the wide bandgap semiconductor and have a rated current of a small value (e.g., 450 A) are used as transistors Q13 and Q14, thereby reducing cost.

A current equivalent to the current through transistors Q13 and Q14 flows through diodes D13 and D14, so that diodes D13 and D14 perform the reverse recovery operation. No current flows through diodes D11 and D12. As is commonly known, diodes D11 and D12 are provided to protect transistors Q11 and Q12 from a voltage generated in an inductor when the inductor is used as the load.

Thus, Schottky barrier diodes that are made of SiC being a wide bandgap semiconductor and have a rated current of a value (e.g., 500 A) equivalent to that of transistors Q13 and Q14 are used as diodes D13 and D14 as described above, thereby reducing recovery loss during the reverse recovery operation. Diodes that are made of Si being a semiconductor other than the wide bandgap semiconductor and have a rated current of a small value (e.g., 300 A) are used as diodes D11 and D12, thereby reducing cost.

Figure 10:
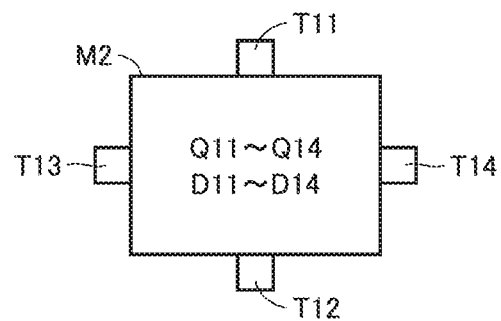
FIG. 10 is a block diagram showing a configuration of a semiconductor module of the inverter shown in FIG. 6.

FIG. 10 shows the appearance of inverter 3 shown in FIG. 6. With reference to FIG. 10, inverter 3 includes one semiconductor module M2. Semiconductor module M2 is internally provided with transistors Q1 to Q14 and diodes D11 to D14. Semiconductor module M2 is externally provided with input terminals T11 to T13 and output terminal T14. Further, although semiconductor module M2 is externally provided with four signal terminals for supplying PWM signals φ11 to φ14 to the gates of transistors Q11 to Q14, the four terminals are not shown for simplicity of the drawing.

As described above, N-channel MOS transistors made of wide bandgap semiconductors are used as transistors Q11 and Q12 that turn on/off current and IGBTs made of semiconductors other than wide bandgap semiconductors are used as transistors Q13 and Q14 that do not turn on/off current in Embodiment 2, thus reducing switching loss and cost.

Further, Schottky barrier diodes made of wide bandgap semiconductors are used as diodes D13 and D14 that perform the reverse recovery operation and diodes made of semiconductors other than wide bandgap semiconductors are used as diodes D11 and D12 that do not perform the reverse recovery operation, thus reducing the recovery loss and cost.

Although SiC is used as a wide bandgap semiconductor in Embodiment 2, the present invention is not limited to this. Any other semiconductor can be used as long as it is a wide bandgap semiconductor. For example, gallium nitride (GaN) can be used as the wide bandgap semiconductor.

Embodiment 3

Figure 11:
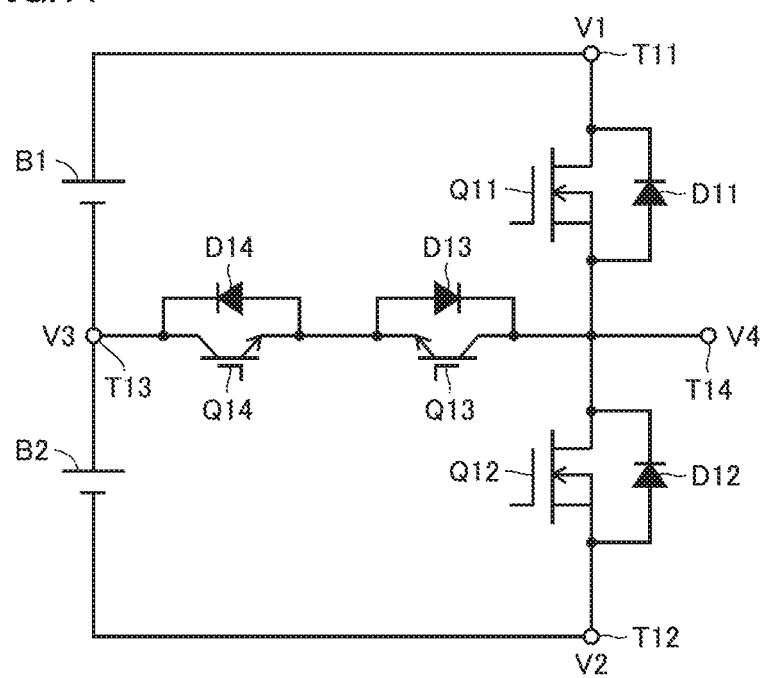
FIG. 11 is a circuit diagram showing a configuration of an inverter of an uninterruptible power system according to Embodiment 3 of the present invention.

FIG. 11 is a circuit diagram showing a configuration of an inverter of an uninterruptible power system according to Embodiment 3 of the present invention, which is compared with FIG. 6. With reference to FIG. 11, this inverter differs from inverter 3 of FIG. 6 in that the parallel connection structure of transistor Q13 and diode D13 and the parallel connection structure of transistor Q14 and diode D14 are replaced. Transistors Q13 and Q14 have emitters connected to each other and collectors connected respectively to input terminal T13 and output terminal T14. Transistors Q11 to Q14 are controlled respectively by PWM signals φ11 to φ14. When DC voltages V1 and V3 are alternately output to output terminal T14, transistor Q14 is turned on and transistors Q11 and Q13 are alternately turned on. When DC voltages V2 and V3 are alternately output to output terminal T14, transistor Q13 is turned on and transistors Q12 and Q14 are alternately turned on.

Since the other configuration and operation are the same as those of Embodiment 2, description thereof will not be repeated. Embodiment 3 also achieves the same effects as those of Embodiment 2.

Embodiment 4

Figure 12:
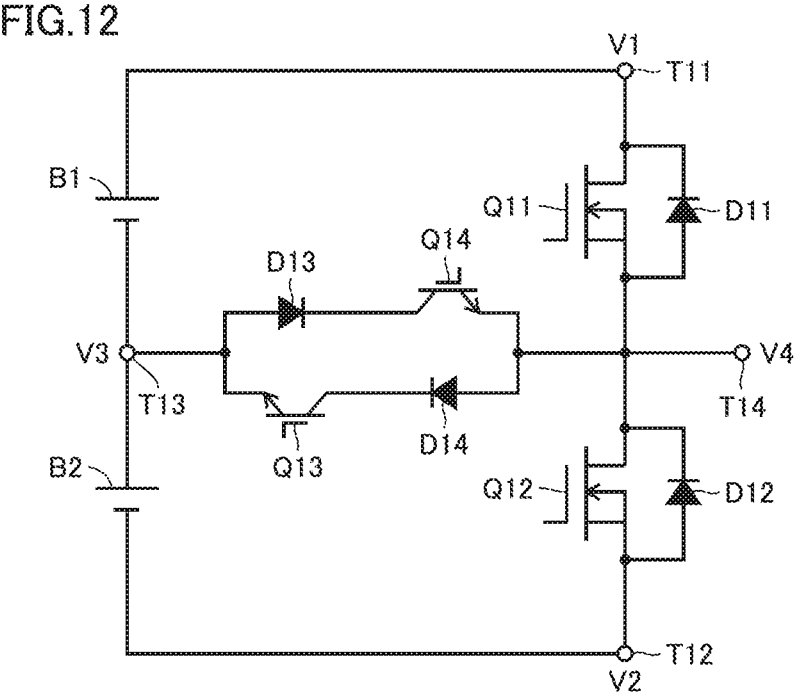
FIG. 12 is a circuit diagram showing a configuration of an inverter of an uninterruptible power system according to Embodiment 4 of the present invention.

FIG. 12 is a circuit diagram showing a configuration of an inverter of an uninterruptible power system according to Embodiment 4 of the present invention, which is compared with FIG. 6. With reference to FIG. 12, this inverter differs from inverter 3 of FIG. 6 in that the collectors of transistors Q13 and Q14 are isolated from the cathodes of diodes D13 and D14, the collector of transistor Q13 and the cathode of diode D14 are connected, and the collector of transistor Q14 and the cathode of diode D13 are connected.

Transistors Q11 to Q14 are controlled respectively by PWM signals φ11 to φ14. When DC voltages V1 and V3 are alternately output to output terminal T14, transistor Q14 is turned on and transistors Q11 and Q13 are alternately turned on. When DC voltages V2 and V3 are alternately output to output terminal T14, transistor Q13 is turned on and transistors Q12 and Q14 are alternately turned on.

Since the other configuration and operation are the same as those of Embodiment 2, description thereof will not be repeated. Embodiment 4 also achieves the same effects as those of Embodiment 2.

Embodiment 5

Figure 13:
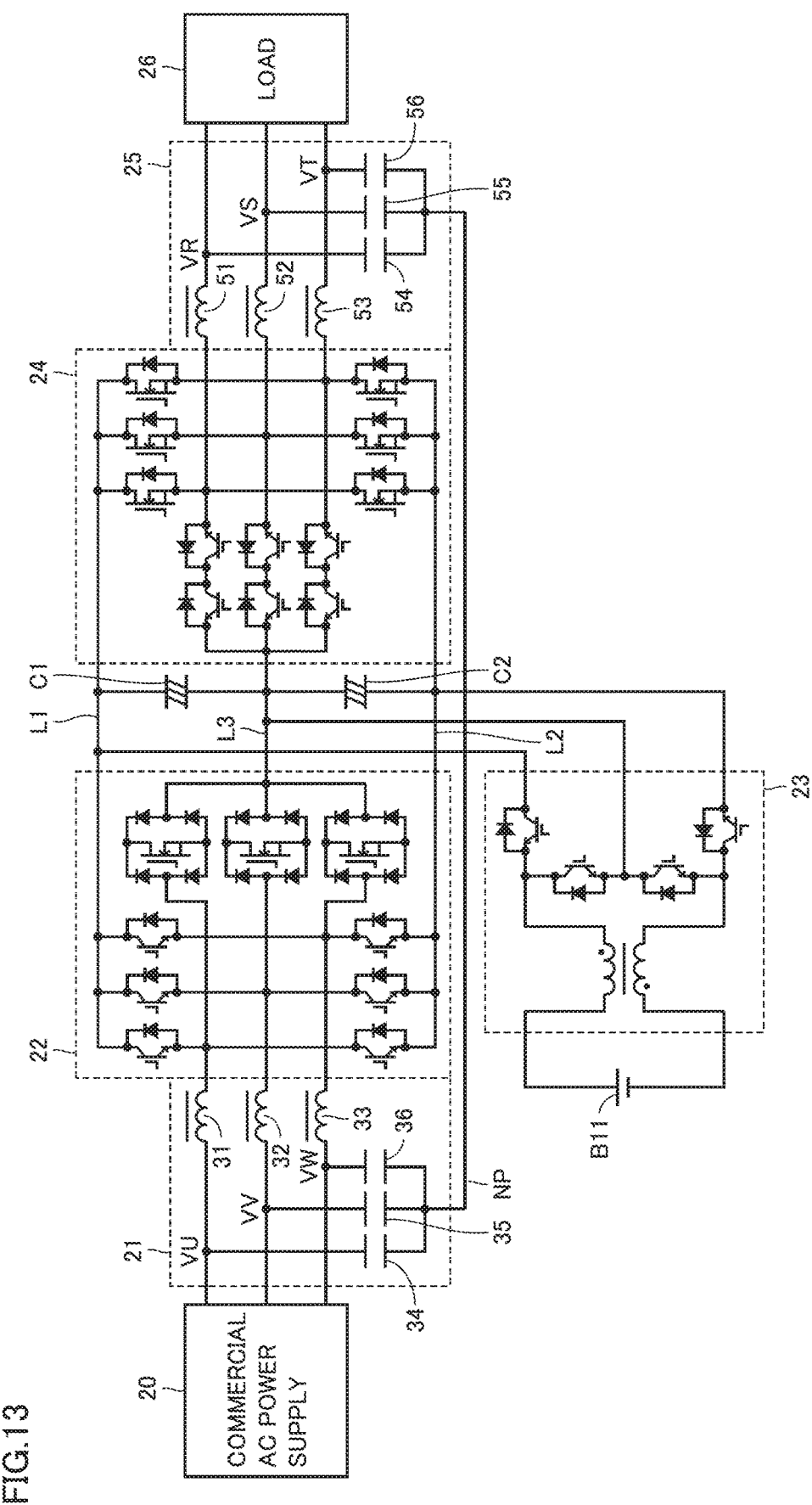
FIG. 13 is a circuit block diagram showing a configuration of an uninterruptible power system according to Embodiment 5 of the present invention.
Figure 14:
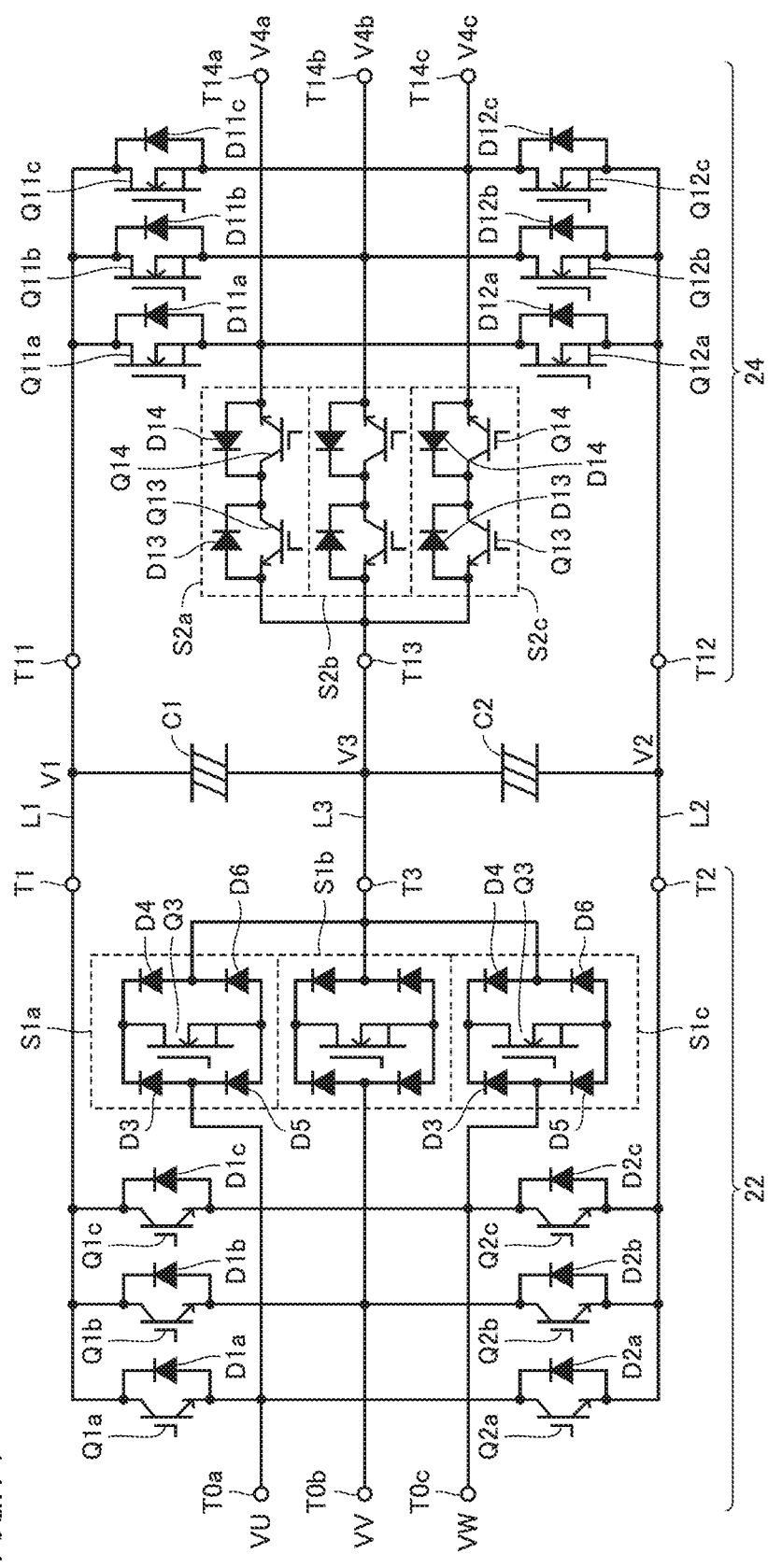
FIG. 14 is a circuit diagram showing configurations of a converter and an inverter shown in FIG. 13.
Figure 15:
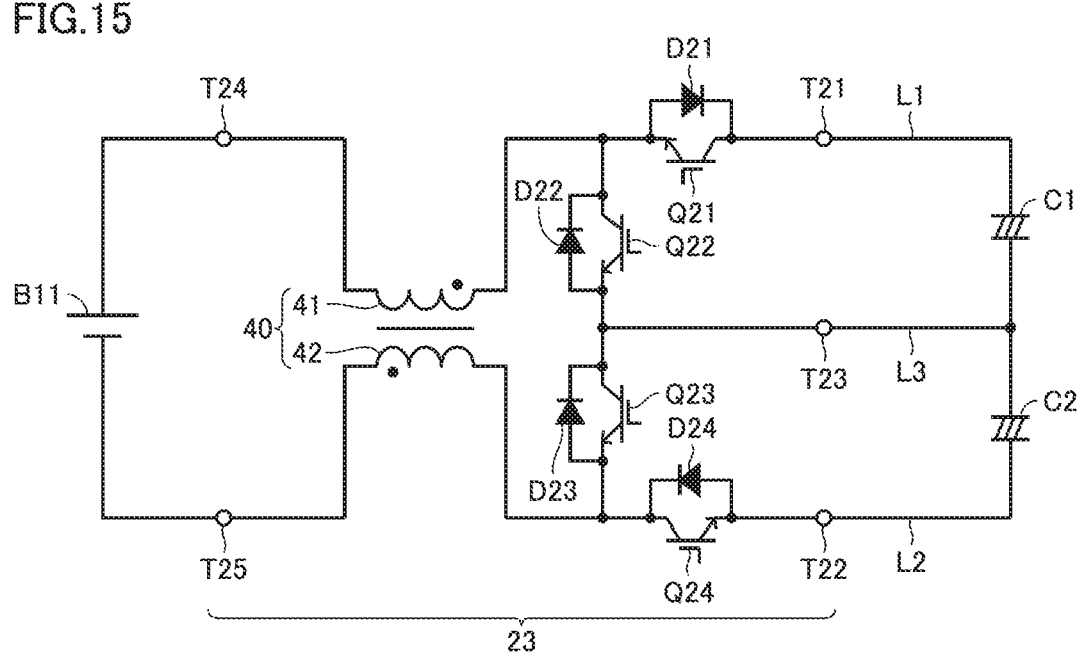
FIG. 15 is a circuit diagram showing a configuration of a bidirectional chopper shown in FIG. 13.

FIG. 13 is a circuit block diagram showing a configuration of an uninterruptible power system according to Embodiment 5 of the present invention. FIG. 14 is a circuit diagram showing configurations of a converter 22 and an inverter 24 shown in FIG. 13. FIG. 15 is a circuit diagram showing a configuration of a bidirectional chopper 23 shown in FIG. 13. With reference to FIGS. 13 to 15, the uninterruptible power system includes an input filter 21, converter 22, a DC positive bus L1, a DC negative bus L2, a DC neutral point bus L3, capacitors C1 and C2, bidirectional chopper 23, inverter 24, and an output filter 25. For simplicity of the drawing, a controller that controls converter 22, bidirectional chopper 23, and inverter 24 will not be shown.

Input filter 21 includes reactors 31 to 33 and capacitors 34 to 36. Reactors 31 to 33 have first terminals that respectively receive three-phase AC voltages VU, VV, and VW from commercial AC power supply 20 and second terminals connected respectively to input terminals T0a to T0c of converter 22. Capacitors 34 to 36 have first electrodes connected respectively to the first terminals of reactors 31 to 33 and second electrodes connected together to neutral point NP. Reactors 31 to 33 and capacitors 34 to 36 constitute a low pass filter. Input filter 21 allows the three-phase AC power of a commercial frequency from commercial AC power supply 20 to pass through converter 22 and also prevents a signal of a carrier frequency generated in converter 22 from passing toward commercial AC power supply 20.

DC positive bus L1, DC negative bus L2, and DC neutral point bus L3 have first terminals connected respectively to output terminals T1, T2, and T3 of converter 22 and second terminals connected respectively to input terminals T11, T12, and T13 of inverter 24. Capacitor C1 is connected between buses L1 and L3, and capacitor C2 is connected between buses L3 and L2. Buses L1 to L3 are connected to battery B11 via bidirectional chopper 23.

As shown in FIG. 14, converter 22 includes input terminals T0a to T0c, output terminals T1 to T3, diodes D1a to D1c and D2a to D2c, transistors Q1a to Q1c and Q2a to Q2c, and bidirectional switches S1a to S1c. Input terminals T0a to T0c respectively receive three-phase AC voltages VU, VV, and VW supplied from commercial AC power supply 20 via input filter 21.

Diodes D1a to D1c have anodes connected respectively to input terminals T0a to T0c and cathodes connected together to output terminal T1. Diodes D2a to D2c have anodes connected together to output terminal T2 and cathodes connected respectively to input terminals T0a to T0c.

Transistors Q1a to Q1c have collectors connected together to output terminal T1 and emitters connected respectively to input terminals T0a to T0c. Transistors Q2a to Q2c have collectors connected respectively to input terminals T0a to T0c and emitters connected together to output terminal T2.

Transistors Q1a to Q1c are connected respectively by PWM signals φ1a, φ1b, and φ1c from the controller (not shown). The waveforms of PWM signals φ1a, φ1b, and φ1c are similar to the waveform of the inversion signal of PWM signal φ1B shown in FIG. 2(c). The phases of PWM signals φ1a, φ1b, and φ1c are synchronized respectively with the phases of three-phase AC voltages VU, VV, and VW, and are shifted from each other by 120 degrees.

Transistors Q2a to Q2c are controlled respectively by PWM signals φ2a, φ2b, and φ2c from the controller (not shown). The waveforms of PWM signals φ2a, φ2b, and φ2c are similar to the waveform of the inversion signal of PWM signal φ2B shown in FIG. 2(b). The phases of PWM signals φ2a, φ2b, and φ2c are synchronized respectively with the phases of three-phase AC voltages VU, VV, and VW and are shifted from each other by 120 degrees.

Bidirectional switches S1a to S1c have first terminals connected respectively to input terminals T0a to T0c and second terminals connected together to output terminal T3. Each of bidirectional switches S1a to S1c includes diodes D3 to D6 and N-channel MOS transistor Q3 as shown in FIG. 1.

The anode of diode D3 and the cathode of diode D5 are connected together to input terminal T0a (or T0b or T0c). The anode of diode D4 and the cathode of diode D6 are connected together to output terminal T3. The cathodes of diodes D3 and D4 are connected to each other, and the anodes of diodes D5 and D6 are connected to each other. The drain of transistor Q3 is connected to the cathodes of diodes D3 and D4, and the source of transistor Q3 is connected to the anodes of diodes D5 and D6.

Transistors Q3 of bidirectional switches S1a to S1c are controlled respectively by PWM signals φ3a, φ3b, and φ3c from the controller (not shown). The waveforms of PWM signals φ3a, φ3b, and φ3c are similar to the waveform of PWM signal φ3 shown in FIG. 2(d). The phases of PWM signals φ3a, φ3b, and φ3c are synchronized respectively with the phases of three-phase AC voltages VU, VV, and VW and are shifted from each other by 120 degrees.

That is to say, input terminal T0a, output terminals T1 to T3, diodes D1a and D2a, transistors Q1a and Q2a, and bidirectional switch S1a constitute the converter shown in FIG. 1, and the converter converts AC voltage VU into DC voltages V1 to V3 and outputs these DC voltages to output terminals T1 to T3. Input terminal T0b, output terminals T1 to T3, diodes D1b and D2b, transistors Q1b and Q2b, and bidirectional switch S1b constitute the converter shown in FIG. 1, and the converter converts AC voltage VV into DC voltages V1 to V3 and outputs these DC voltages to output terminals T1 to T3.

Input terminal T0c, output terminals T1 to T3, diodes D1c and D2c, transistors Q1c and Q2c, and bidirectional switch S1c constitute the converter shown in FIG. 1, and the converter converts AC voltage VW into DC voltages V1 to V3 and outputs these DC voltages to output terminals T1 to T3. Converter 22 converts three-phase AC voltages VU, VV, and VW into DC voltages V1 to V3 and outputs these DC voltages to output terminals T1 to T3.

As described in Embodiment 1, diodes D1a to D1c and D2a to D2c and transistors Q3 of bidirectional switches S1a to S1c are made of wide bandgap semiconductors, and transistors Q1a to Q1c and Q2a to Q2c and diodes D3 to D6 of bidirectional switches S1a to S1c are made of semiconductors other than the wide bandgap semiconductors. The rated current of each of diodes D1a to D1c and D2a to D2c is greater than the rated current of each of transistors Q1a to Q1c and Q2a to Q2c, diodes D3 to D6, and transistor Q3. The rated current of each of transistors Q1a to Q1c and Q2a to Q2c is smaller than the rated current of each of diodes D1a to D1c, D2a to D2c, and D3 to D6, and transistor Q3.

During the normal operation in which commercial AC power supply 20 supplies three-phase AC power normally, converter 22 converts the three-phase AC power supplied from commercial AC power supply 20 via input filter 21 into DC power and supplies the DC power to battery B11 via bidirectional chopper 23 and also to inverter 24. Battery B11 stores DC power.

In other words, converter 22 is controlled by PWM signals φ1a to φ1c, φ2a to φ2c, and φ3a to φ3c supplied from the controller (not shown), generates DC voltages V1 to V3 based on three-phase AC voltages VU, VV, and VW supplied from commercial AC power supply 20 via input filter 21, and supplies DC voltages V1 to V3 generated respectively to DC positive bus L1, DC negative bus L2, and DC neutral point bus L3. When output terminal T3 is grounded, DC voltages V1 to V3 are respectively a positive voltage, a negative voltage, and 0 V.

When voltage V1 at output terminal T1 is higher than rated voltage V1R due to the regenerated power generated in load 26, a current flows from output terminal T1 via transistors Q1a to Q1c to input terminals T0a to T0c, so that voltage V1 at output terminal T1 decreases to rated voltage V1R. When voltage V2 at output terminal T2 falls below rated voltage V2R due to the regenerated power generated in load 26, a current flows from input terminals T0a to T0c via transistors Q2a to Q2c to output terminal T2, so that voltage V2 at output terminal T2 rises to rated voltage V2R.

DC voltages V1 to V3 are smoothed by capacitors C1 and C2. DC voltages V1 to V3 are supplied to battery B11 via bidirectional chopper 23 and are also supplied to inverter 24. During a power failure in which a supply of AC power from commercial AC power supply 20 is stopped, transistors Q1a to Q1c, Q2a to Q2c, and Q3 are set to off state, so that the operation of converter 22 is stopped.

Bidirectional chopper 23 supplies DC power from capacitors C1 and C2 to battery B11 when three-phase AC power is supplied from commercial AC power supply 20, and supplies DC power from battery B11 to capacitors C1 and C2 when a supply of three-phase AC power is stopped from commercial AC power supply 20, that is, during a power failure.

That is to say, as shown in FIG. 15, bidirectional chopper 23 includes terminals T21 to T25, transistors Q21 to Q24, diodes D21 to D24, and a normal-mode reactor (DC reactor) 40. Terminals T21 to T23 are connected respectively to DC positive bus L1, DC negative bus L2, and DC neutral point bus L3. Terminals T24 and T25 are connected respectively to the positive electrode and negative electrode of battery B11.

Transistors Q21 and Q22 are connected in series between terminals T21 and T23, and transistors Q23 and Q24 are connected in series between terminals T23 and T22. Diodes D21 to D24 are connected respectively in anti-parallel with transistors Q21 to Q24. Normal-mode reactor 40 includes a coil 41 connected between a node between transistors Q21 and Q22 and terminal T24, and a coil 42 connected between terminal T25 and a node between transistors Q23 and Q24.

Each of transistors Q21 to Q24 is an IGBT made of silicon (Si) that is a semiconductor other than a wide bandgap semiconductor. Each of diodes D21 to D24 is made of silicon (Si) that is a semiconductor other than a wide bandgap semiconductor.

When three-phase AC power is supplied from commercial AC power supply 20, DC power is supplied from capacitors C1 and C2 via bidirectional chopper 23 to battery B11, charging battery B11. In this case, transistors Q22 and Q23 are set to off state, and transistors Q21 and Q24 are alternately turned on.

That is to say, in the first battery charge mode, transistors Q22 to Q24 are turned off, and transistor Q21 is turned on. Consequently, a current flows from terminal T21 via transistor Q21, coil 41, battery B11, coil 42, and diode D23 to terminal T23, discharging capacitor C1 to charge battery B11.

In the second battery charge mode, transistors Q22 and Q23 are turned off, and transistors Q21 and Q24 are turned on. Consequently, a current flows from terminal T21 via transistor Q21, coil 41, battery B11, coil 42, and transistor Q24 to terminal T22, discharging capacitors C1 and C2 to charge battery B11.

In the third battery charge mode, transistors Q21 to Q23 are turned off, and transistor Q24 is turned on. Consequently, a current flows from terminal T23 via diode D22, coil 41, battery B11, coil 42, and transistor Q24 to terminal T22, discharging capacitor C2 to charge battery B11.

The first battery charge mode and the third battery charge mode are performed alternately. During a period between the first battery charge mode and the third battery charge mode, electromagnetic energy stored in coils 41 and 42 is released, and a current flows through a path formed of diode D22, coil 41, battery B11, coil 42, and diode D23, charging battery B11. In the second battery charge mode, the first battery charge mode and the third battery charge mode coincide with each other.

When a supply of three-phase AC power from commercial AC power supply 20 is stopped, DC power is supplied from battery B11 via bidirectional chopper 23 to capacitors C1 and C2, charging capacitors C1 and C2. In this case, transistors Q21 and Q24 are fixed to off state, and transistors Q22 and Q23 are alternately turned on.

That is to say, in the first battery discharge mode, transistors Q21, Q23, and Q24 are turned off, and transistor Q22 is turned on. Consequently, a current flows from the positive electrode of battery B11 via coil 41, transistor Q22, capacitor C2, diode D24, and coil 42 to battery B11, discharging battery B11 to charge capacitor C2.

In the second battery discharge mode, transistors Q21 to Q24 are turned off. Consequently, a current flows from the positive electrode of battery B11 via coil 41, diode D21, capacitors C1 and C2, diode D24, and coil 42 to the negative electrode of battery B11, discharging battery B11 to charge capacitors C1 and C2.

In the third battery discharge mode, transistors Q21, Q22, and Q24 are turned off, and transistor Q23 is turned on. Consequently, a current flows from the positive electrode of battery B11 via coil 41, diode D21, capacitor C1, transistor Q23, and coil 42 to the negative electrode of battery B11, discharging battery B11 to charge capacitor C1.

The first battery discharge mode and the third battery discharge mode are performed alternately. During a period between the first battery discharge mode and the third battery discharge mode, the second battery discharge mode is performed if the voltage between terminals T21 and T22 is lower than the voltage across battery B11.

As shown in FIG. 14, inverter 24 includes input terminals T11 to T13, output terminals T14a to T14c, transistors Q11a to Q11c and Q12a to Q12c, diodes D11a to D11c and D12a to D12c, and bidirectional switches S2a to S2c. Input terminals T11 to T13 are connected respectively to DC positive bus L1, DC negative bus L2, and DC neutral point bus L3.

Transistors Q11a to Q11c have drains connected together to input terminal T11 and sources connected respectively to output terminals T14a to T14c. Transistors Q12a to Q12c have drains connected respectively to output terminals T14a to T14c and sources connected together to input terminal T12. Diodes D11a to D11c and D12a to D12c are connected respectively in anti-parallel with transistors Q11a to Q11c and Q12a to Q12c.

Bidirectional switches S2a to S2c have first terminals connected together to input terminal T13 and second terminals connected respectively to output terminals T14a to T14c. Each of bidirectional switches S2a to S2c includes transistors Q13 and Q14 and diodes D13 and D14, as shown in FIG. 6.

The collectors of transistors Q13 and Q14 are connected to each other, the emitter of transistor Q13 is connected to input terminal T13, and the emitter of transistor Q14 is connected to output terminal T14a (or T14b or T14c). Diodes D13 and D14 are connected respectively in anti-parallel with transistors Q13 and Q14.

Transistors Q11a to Q11c are controlled respectively by PWM signals φ11a, φ11b, and φ11c from the controller (not shown). The waveforms of PWM signals φ11a, φ11b, and φ11c are similar to the waveform of PWM signal φ11 shown in FIG. 7(b). The phases of PWM signals φ11a, φ11b, and φ11c are synchronized respectively with the phases of three-phase AC voltages VU, VV, and VW and are shifted from each other by 120 degrees.

Transistors Q12a to Q12c are controlled respectively by PWM signals φ12a, φ12b, and φ12c from the controller (not shown). The waveforms of PWM signals φ12a, φ12b, and φ12c are similar to the waveform of PWM signal φ12 shown in FIG. 7(e). The phases of PWM signals φ12a, φ12b, and φ12c are synchronized respectively with the phases of three-phase AC voltages VU, VV, and VW and are shifted from each other by 120 degrees.

Transistors Q13 of bidirectional switches S2a to S2c are controlled respectively by PWM signals φ13a, φ13b, and φ13c from the controller (not shown). As shown in FIG. 7(d), PWM signals φ13a, φ13b, and φ13c are respectively complementary signals of PWM signals φ11a, φ11b, and φ11c.

Transistors Q14 of bidirectional switches S2a to S2c are controlled respectively by PWM signals φ14a, φ14b, and φ14c from the controller (not shown). As shown in FIG. 7(c), PWM signals φ14a, φ14b, and φ14c are respectively complementary signals of PWM signals φ12a, φ12b, and φ12c.

That is to say, input terminals T11 to T13, output terminal T14a, transistors Q11a and Q12a, diodes D11a and D12a, and bidirectional switch S2a constitute the inverter shown in FIG. 6, and the converter converts DC voltages V1 to V3 into AC voltage V4a and outputs it to output terminal T14a.

Input terminals T11 to T13, output terminal T14b, transistors Q11b and Q12b, diodes D11b and D12b, and bidirectional switch S2b constitute the inverter shown in FIG. 6, and the inverter converts DC voltages V1 to V3 into AC voltage V4b and outputs it to output terminal T14b.

Input terminals T11 to T13, output terminal T14c, transistors Q11c and Q12c, diodes D11c and D12c, and bidirectional switch S2c constitute the inverter shown in FIG. 6, and the inverter converts DC voltages V1 to V3 into AC voltage V4c and outputs it to output terminal T14c. AC voltages V4a to V4c change respectively in synchronization with three-phase AC voltages VU, VV, and VW, and the phases of AC voltages V4a to V4c are shifted from each other by 120 degrees.

As described in Embodiment 2, transistors Q11a to Q11c and Q12a to Q12c and diodes D13 and D14 of bidirectional switches S2a to S2c are made of wide bandgap semiconductors, and diodes D11a to D11c and D12a to D12c and transistors Q13 and Q14 of bidirectional switches S2a to S2c are made of semiconductors other than wide bandgap semiconductors. The rated current of each of transistors Q11a to Q11c and Q12a to Q12c is greater than the rated current of each of transistors Q13 and Q14 and diodes D11a to D11c, D12a to D12c, D13, and D14.

Inverter 24 converts the DC power generated in converter 22 into three-phase AC power during a normal operation in which three-phase AC power is supplied normally from commercial AC power supply 20 and converts the DC power supplied from battery B11 via bidirectional chopper 23 into three-phase AC power during a power failure in which a supply of AC power from commercial AC power supply 20 is stopped.

In other words, inverter 24 generates three-phase AC voltages V4a to V4c based on DC voltages V1 to V3 supplied from converter 22 via buses L1 to L3 during a normal operation and generates three-phase AC voltages V4a to V4c based on DC voltages V1 to V3 supplied from battery B11 via bidirectional chopper 23 and buses L1 to L3 during a power failure.

As shown in FIG. 13, output filter 25 includes reactors 51 to 53 and capacitors 54 to 56. Reactors 51 to 53 have first terminals connected respectively to output terminals T14a to T14c of inverter 24 and second terminals connected together to load 26. Capacitors 54 to 56 have first electrodes connected respectively to the second terminals of reactors 51 to 53 and second electrodes connected together to neutral point NP. Reactors 51 to 53 and capacitors 54 to 56 constitute a low pass filter.

Output filter 25 allows AC power having a commercial frequency of the AC power output from inverter 24 to pass through load 26 and also prevents a signal having a carrier frequency generated in inverter 24 from passing toward load 26. In other words, output filter 25 converts output voltages V4a to V4c of inverter 24 into three-phase AC voltages VR, VS, and VT with a sinusoidal signal of a commercial frequency and supplies these voltages to load 26. Load 26 is driven by three-phase AC voltages VR, VS, and VT.

The controller (not shown) controls converter 22, bidirectional chopper 23, and inverter 24 by supplying PWM signals while monitoring, for example, three-phase AC voltages VU, VV, and VW from commercial AC power supply 20, three-phase AC voltages VR, VS, and VT output to load 26, DC voltages V1 to V3, and the voltage between terminals of battery B11.

The operation of this uninterruptible power system will now be described. During a normal operation in which commercial AC power supply 20 supplies three-phase AC power normally, AC power from commercial AC power supply 20 is supplied to converter 22 via input filter 21 and is converted into DC power by converter 22. The DC power generated in converter 22 is stored in battery B11 via bidirectional chopper 23 and is also supplied to inverter 24, and is then converted into three-phase AC power of a commercial frequency by inverter 24. The three-phase AC power generated in inverter 24 is supplied to load 26 via output filter 25, so that load 26 is operated.

At the occurrence of regenerated power in load 26, the regenerated power is returned to commercial AC power supply 20 via output filter 25, inverter 24, buses L1 to L3, converter 22, and input filter 21.

During a power failure in which a supply of AC power from commercial AC power supply 20 is stopped, the operation of converter 22 is stopped, and simultaneously, the DC power of battery B11 is supplied to inverter 24 via bidirectional chopper 23 and is converted into three-phase AC power of a commercial frequency by inverter 24. The three-phase AC power generated in inverter 24 is supplied to load 26 via output filter 25, so that the operation of load 26 is continued.

Even when a power failure occurs, thus, the operation of load 26 is continued as long as battery B11 stores DC power. When commercial AC power supply 20 restarts supplying AC power, the operation of converter 22 is restarted, and the DC power generated in converter 22 is supplied to battery B11 via bidirectional chopper 23 and also to inverter 24, returning to its original state. Embodiment 5 also achieves the same effects as those of Embodiments 1 to 4.

It should be construed that the embodiments disclosed herein are given by way of illustration in all respects, not by way of limitation. It is therefore intended that the scope of the present invention is defined by claims, not only by the embodiments described above, and encompasses all modifications and variations equivalent in meaning and scope to the claims.

REFERENCE SIGNS LIST

T0, T0a to T0c, T11 to T13 input terminal, T1 to T3, T14, T14a to T14c output terminal, T21 to T25 terminal, Q1 to Q3, Q1a to Q1c, Q2a to Q2c, Q11 to Q14, Q11a to Q11c, Q12a to Q12c, Q21 to Q24 transistor, D1 to D6, D1a to D1c, D2a to D2c, D11 to D14, D11a to D11c, D12a to D12c, D21 to D24 diode, B1, B2, B11 battery, M1, M2 semiconductor module, 1, 21 input filter, 2, 22 converter, L1 DC positive bus, L2 DC negative bus, L3 DC neutral point bus, C1, C2, 34 to 36, 54 to 56 capacitor, 3, 24 inverter, 4, 25 output filter, 5 controller, 10, 20 commercial AC power supply, 11, 26 load, 23 bidirectional chopper, 31 to 33, 51 to 53 reactor, S1a to S1c, S2a to S2c bidirectional switch, 40 normal-mode reactor, 41, 42 coil.

The invention claimed is:

1. A converter that converts an AC voltage supplied to an input terminal into first to third DC voltages and outputs the first to third DC voltages respectively to first to third output terminals, the converter comprising:
   a first diode having an anode and a cathode connected respectively to the input terminal and the first output terminal;
   a second diode having an anode and a cathode connected respectively to the second output terminal and the input terminal;
   a first transistor connected between the first output terminal and the input terminal;
   a second transistor connected between the input terminal and the second output terminal; and
   a first bidirectional switch connected between the input terminal and the third output terminal,
   the first DC voltage being higher than the second DC voltage, and the third DC voltage being an intermediate voltage between the first and second DC voltages,
   the first bidirectional switch including third to sixth diodes and a third transistor,
   the third and fourth diodes having anodes connected respectively to the input terminal and the third output terminal and cathodes connected together to a first electrode of the third transistor,
   the fifth and sixth diodes having cathodes connected respectively to the input terminal and the third output terminal and anodes connected together to a second electrode of the third transistor,
   each of the first diode, the second diode, and the third transistor being made of a wide bandgap semiconductor,
   each of the first transistor, the second transistor, and the third to sixth diodes being made of a semiconductor other than the wide bandgap semiconductor,
   wherein a rated current of each of the first and second diodes is greater than a rated current of each of the third to sixth diodes and the first to third transistors.

2. The converter according to claim 1, wherein
   the first and third transistors are alternately turned on when the AC voltage is a positive voltage, and
   the second and third transistors are alternately turned on when the AC voltage is a negative voltage.

3. The converter according to claim 1, comprising a semiconductor module including the first to sixth diodes and the first to third transistors.

4. The converter according to claim 1, wherein a rated current of each of the first and second transistors is smaller than the rated current of each of the first to sixth diodes and the third transistor.

5. The converter according to claim 1, wherein the wide bandgap semiconductor comprises SiC, and the semiconductor other than the wide bandgap semiconductor comprises Si.

6. A power conversion apparatus comprising:
   a converter according to claim 1; and
   an inverter configured to convert first to third DC voltages supplied respectively to the first to third output terminals into an AC voltage at three levels and output the AC voltage to a fourth output terminal,
   the inverter including
      a fourth transistor having first and second electrodes connected respectively to the first and fourth output terminals,
      a fifth transistor having first and second electrodes connected respectively to the fourth and second output terminals,
      seventh and eighth diodes connected respectively in anti-parallel with the fourth and fifth transistors, and
      a second bidirectional switch connected between the third and fourth output terminals,
   the second bidirectional switch including sixth and seventh transistors and ninth and tenth diodes,
   each of the fourth transistor, the fifth transistor, the ninth diode, and the tenth diode is made of the wide bandgap semiconductor, and
   each of the sixth transistor, the seventh transistor, the seventh diode, and the eighth diode is made of a semiconductor other than the wide bandgap semiconductor.

7. The power conversion apparatus according to claim 6, wherein
   the sixth and seventh transistors have first electrodes connected to each other and second electrodes connected respectively to the third and fourth output terminals,
   the ninth and tenth diodes are connected respectively in anti-parallel with the sixth and seventh transistors,
   the seventh transistor is turned on and the fourth and sixth transistors are alternately turned on when the first and third DC voltages are alternately output to the fourth output terminal, and
   the sixth transistor is turned on and the fifth and seventh transistors are alternately turned on when the second and third DC voltages are alternately output to the fourth output terminal.

8. The power conversion apparatus according to claim 6, wherein
   the sixth and seventh transistors have first electrodes connected respectively to the fourth and third output terminals and second electrodes connected to each other,
   the ninth and tenth diodes are connected respectively in anti-parallel with the sixth and seventh transistors,
   the seventh transistor is turned on and the fourth and sixth transistors are alternately turned on when the first and third DC voltages are alternately output to the fourth output terminal, and
   the sixth transistor is turned on and the fifth and seventh transistors are alternately turned on when the second and third DC voltages are alternately output to the fourth output terminal.

9. The power conversion apparatus according to claim 6, wherein
   the sixth and seventh transistors have second electrodes connected respectively to the third and fourth output terminals,
   the ninth and tenth diodes have anodes connected respectively to the third and fourth output terminals and cathodes connected respectively to first electrodes of the seventh and sixth transistors, the seventh transistor is turned on and the fourth and sixth transistors are alternately turned on when the first and third DC voltages are alternately output to the fourth output terminal, and the sixth transistor is turned on and the fifth and seventh transistors are alternately turned on when the second and third DC voltages are alternately output to the fourth output terminal.

10. The power conversion apparatus according to claim 6, wherein the inverter includes a semiconductor module including the fourth to seventh transistors and the seventh to tenth diodes.

11. The power conversion apparatus according to claim 6, wherein a rated current of each of the fourth and fifth transistors is greater than a rated current of each of the sixth and seventh transistors and the seventh to tenth diodes.

12. The power conversion apparatus according to claim 6, wherein the wide bandgap semiconductor comprises SiC, and the semiconductor other than the wide bandgap semiconductor comprises Si.

* * * * *

UNITED STATES PATENT AND TRADEMARK OFFICE
CERTIFICATE OF CORRECTION

PATENT NO. : 10,630,195 B2  
APPLICATION NO. : 16/080838  
DATED : April 21, 2020  
INVENTOR(S) : Keisuke Ohnishi et al.

Page 1 of 1

It is certified that error appears in the above-identified patent and that said Letters Patent is hereby corrected as shown below:

On the Title Page

Item (54) and in the Specification, Column 1 Line 1 should read:  
-- CONVERTER AND POWER CONVERSION APPARATUS INCLUDING THE SAME --

Signed and Sealed this  
Sixteenth Day of June, 2020

Andrei Iancu  
*Director of the United States Patent and Trademark Office*